(12) United States Patent
Sic et al.

(10) Patent No.: US 12,215,764 B2
(45) Date of Patent: Feb. 4, 2025

(54) GEAR MECHANISM

(71) Applicant: Milos Andric, Oslo (NO)

(72) Inventors: Tihomir Sic, Oslo (NO); Vladimir Sic, Oslo (NO)

(73) Assignee: Milos Andric, Oslo (NO)

( * ) Notice: Subject to any disclaimer, the term of this patent is extended or adjusted under 35 U.S.C. 154(b) by 26 days.

(21) Appl. No.: 17/779,059

(22) PCT Filed: Nov. 20, 2020

(86) PCT No.: PCT/EP2020/082872
§ 371 (c)(1),
(2) Date: May 23, 2022

(87) PCT Pub. No.: WO2021/099563
PCT Pub. Date: May 27, 2021

(65) Prior Publication Data
US 2023/0003288 A1     Jan. 5, 2023

(30) Foreign Application Priority Data
Nov. 22, 2019  (NO) .................................. 20191393

(51) Int. Cl.
*F16H 37/00*     (2006.01)
*F16H 37/02*     (2006.01)

(52) U.S. Cl.
CPC .......... *F16H 37/00* (2013.01); *F16H 37/027* (2013.01)

(58) Field of Classification Search
CPC ........... F16H 1/28–48; F16H 37/00–16; F16H 2001/322; F16H 7/04
See application file for complete search history.

(56) References Cited

U.S. PATENT DOCUMENTS 1,920,877 A * 8/1933 Odatto ...................... F16H 1/32
464/99
2,090,810 A * 8/1937 Russell ...................... F16H 1/28
475/346
(Continued)

FOREIGN PATENT DOCUMENTS

DE    102018104758 A1 *  9/2019  ............... F16H 1/28
EP       3270001 A1      1/2018
(Continued)

OTHER PUBLICATIONS

International Search Report and Written Opinion in PCT Application No. PCT/EP2020/082872 mailed on Oct. 3, 2021, 8 pages.

*Primary Examiner* — Lori Wu
(74) *Attorney, Agent, or Firm* — Howard IP Law Group, PC

(57) ABSTRACT

A gear mechanism for increasing torque includes: an input shaft; at least one intermediate shaft; where the at least one intermediate shaft is parallel to and offset from the input shaft; at least one force transmitting member connecting the input shaft and the at least one intermediate shaft; where the at least one force transmitting member is configured for rotating the at least one intermediate shaft in the same direction as the input shaft. The at least one intermediate shaft is mated with at least one fixed mating member and is rotatably connected to a rotatable support member. The support member is rotatable about the input shaft and connected to an output shaft.

15 Claims, 16 Drawing Sheets

(56) References Cited

U.S. PATENT DOCUMENTS

| | | | | |
|---|---|---|---|---|
| 2,140,790 | A | * | 12/1938 | Davis ........................ F16H 1/28 |
| | | | | 475/182 |
| 2,495,824 | A | * | 1/1950 | Ripke ........................ F16C 1/04 |
| | | | | 74/423 |
| 2,548,394 | A | * | 4/1951 | Ripke ........................ F16H 1/32 |
| | | | | 475/332 |
| 2,666,188 | A | * | 1/1954 | Klein ........................ F16H 35/00 |
| | | | | 475/11 |
| 6,132,330 | A | * | 10/2000 | Leggett .................... F16H 47/04 |
| | | | | 475/331 |
| 2017/0023068 | A1 | * | 1/2017 | Maw ........................ E21B 4/006 |

FOREIGN PATENT DOCUMENTS

| | | |
|---|---|---|
| GB | 191419535 A | 6/1915 |
| WO | 2012023003 A1 | 2/2012 |
| WO | 2014075177 A1 | 5/2014 |

* cited by examiner

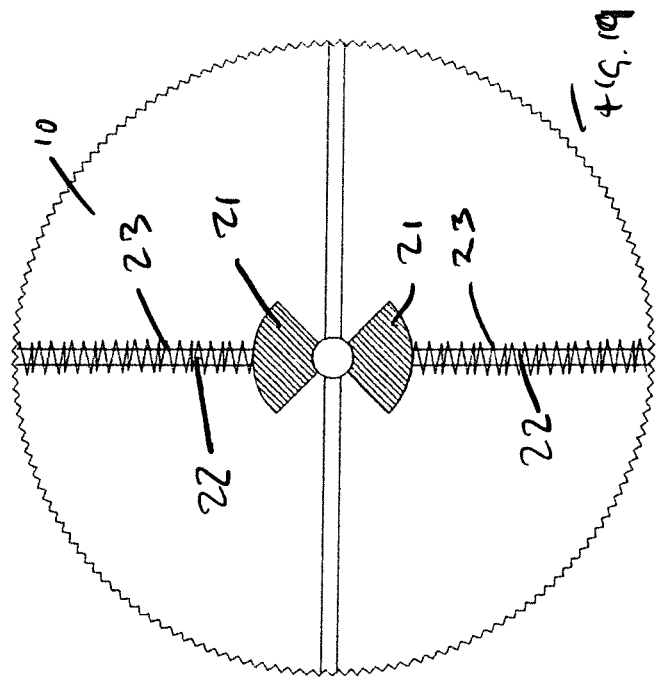
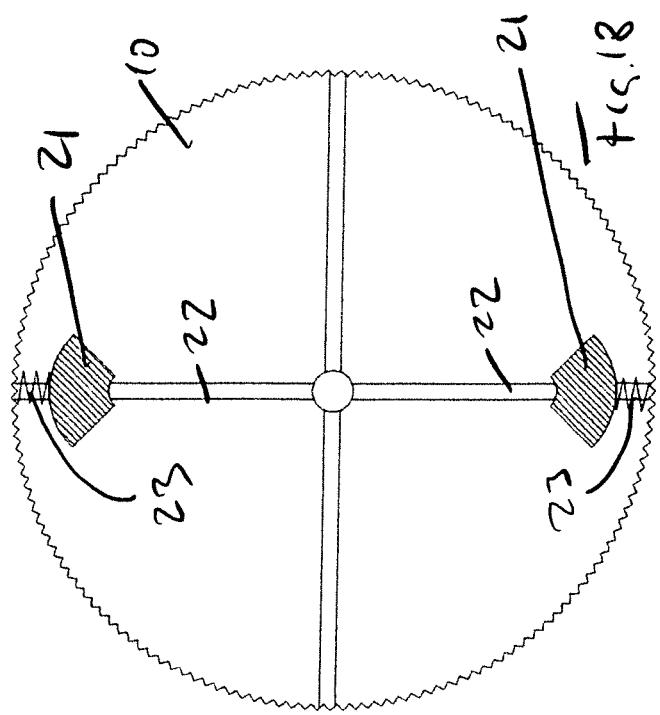

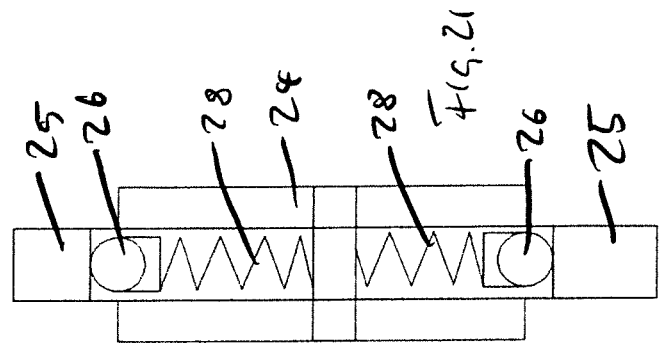
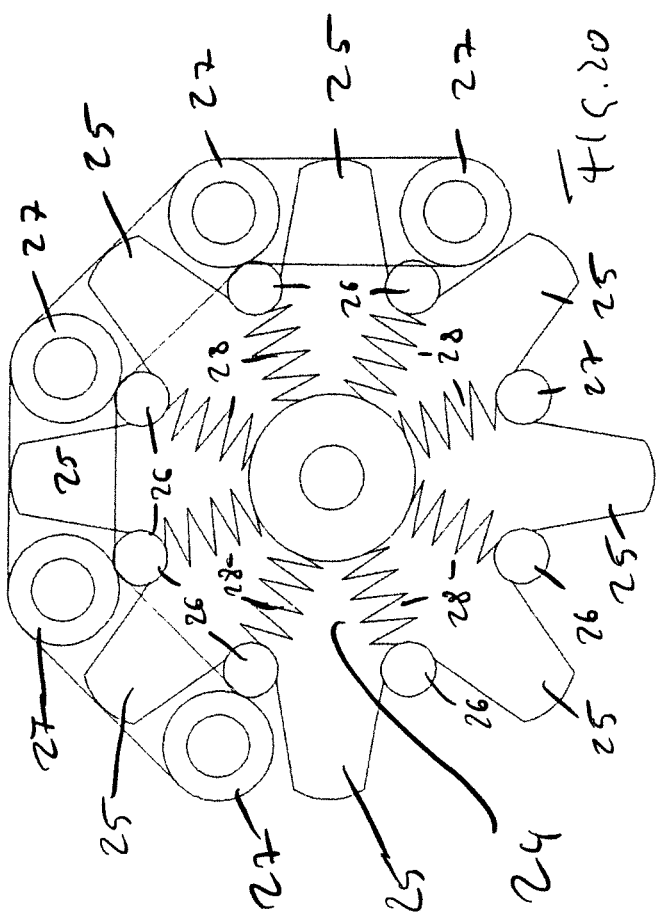

GEAR MECHANISM

The present invention relates to a gear mechanism. More specifically, the disclosure relates to a gear mechanism for increasing the torque in a shaft.

BACKGROUND

The torque of a rotating shaft, such as the output shaft of a motor, may be amplified by a gear mechanism. This is useful if the torque of the motor is not sufficient for a specific purpose, or the motor is not able to provide a sufficient torque. An input shaft of such a gear mechanism may be connected to the output shaft of the motor, and, by various gear transmissions and mechanical couplings, an output shaft of the gear mechanism may be provided with an increased torque. Commonly, the revolutions per minute (RPM) of the output shaft from a mechanical gear mechanism is lower compared to the RPM of the output shaft of the motor, while the torque has increased.

Alternatively, several commonly known torque amplifiers require an added source of energy. As such, the RPM can be constant from the output shaft of the motor to the output shaft of the torque amplifier, while torque is added to the output shaft of the torque amplifier. However, it is often not practical nor an alternative to provide such an external source of energy, such that a gear mechanism as described in the previous section is preferred.

Electric motors are more and more commonly used for a range of applications, and such motors are often compact and lightweight. However, electric motors do not necessarily provide sufficient direct torque, and there is therefore a need for efficient gear mechanisms to provide increased torque. Commonly known gear mechanisms for increasing torque could be as effective as 90-95%, but there is still a loss of energy while the torque is increased, and more efficient gear mechanism are needed in order to more effectively utilize the energy in e.g. electric applications. As such, even a small amount of increase in efficiency of such a gear mechanism could provide a great increase in efficiency of a motor.

Known gear mechanisms are heavy and may comprise several parts, and may be a complex mechanical assembly that is both expensive to manufacture and to maintain. Known gear mechanisms are also in many cases not very reliable, and may require regular maintenance. Known gear mechanisms may neither be suited to a wide range of input RPM.

There is therefore a need for an improved gear mechanism to reduce or eliminate the above mentioned disadvantages of known techniques. It is an objective of the present invention to achieve this and to provide further advantages over the state of the art.

SUMMARY

It is an object of the present invention to mitigate, alleviate or eliminate one or more of the above-identified deficiencies and disadvantages in the prior art and solve at least the above mentioned problem.

According to a first aspect, there is provided a gear mechanism for increasing torque, comprising:
an input shaft;
at least one intermediate shaft;
where the at least one intermediate shaft is parallel and offset from the input shaft; at least one force transmitting member connecting the input shaft and the at least one intermediate shaft;
where the at least one force transmitting member is configured for rotating the at least one intermediate shaft in the same direction as the input shaft;
the at least one intermediate shaft is mating with at least one fixed mating member and is rotatably connected to a rotatable support member;
the support member is rotatable about the input shaft and connected to an output shaft.

The input shaft of the gear mechanism according to the invention can be a solid shaft, but can also be a pipe. The input shaft can be of metal, but can also be of other materials, like plastic materials, composite materials or even wood.

The input shaft can have a continuous outer shape, for example the outer shape of a round cylinder. Other outer shapes of the input shaft are feasible too, like for example polygonal outer shapes. Instead of a continuous outer shape, the input shaft also can have interruptions of a continuous outer shape, for example can have steps inbetween sections, whereby in a preferred embodiment the individual section of the input shaft that borders the step has a continuous shape. Steps can be used to position bearings for example.

The intermediate shaft of the gear mechanism according to the invention can be a solid shaft, but can also be a pipe. The intermediate shaft can be of metal, but can also be of other materials, like plastic materials, composite materials or even wood.

The intermediate shaft can have a continuous outer shape, for example the outer shape of a round cylinder. Other outer shapes of the intermediate shaft are feasible too, like for example polygonal outer shapes. Instead of a continuous outer shape, the intermediate shaft also can have interruptions of a continuous outer shape, for example can have steps inbetween sections, whereby in a preferred embodiment the individual section of the intermediate shaft that borders the step has a continuous shape. Steps can be used to position bearings for example.

According to the invention, at least one intermediate shaft is provided that is parallel and offset from the input shaft. In a preferred embodiment, at least two, preferably at least three, preferably at least four, preferably at least five intermediate shafts are provided. It is believed that in increasing the number of shafts the force is better distributed and the balance is better. Increasing the number of shafts might even reduce the friction inside the mear mechanism. In a preferred embodiment, several, preferably the majority, more preferably all intermediate shafts provided are of the same shape and/or size.

According to the invention, at least one force transmitting member connecting the input shaft and the at least one intermediate shaft is provided. In a preferred embodiment, for each intermediate shaft provided an individual force transmitting member is provided. Designs might be feasible, where one force transmitting member connects several, preferably the majority, preferably all intermediate shafts with the input shaft, for example a chain or a belt. While it is considered feasible within a preferred embodiment to have one force transmitting member connect several, preferably the majority, preferably all intermediate shafts with the input shaft, by way of this force transmitting member being a chain or a belt, in an even more preferred embodiment a chain or a belt is used to implement the preferred embodiment, wherein for each intermediate shaft provided an individual force transmitting member is provided. Hence in a preferred embodiment one belt or one chain is provided per intermediate shaft. Independent of the type of force transmitting member used in a preferred embodiment, for each intermediate shaft provided an individual force transmitting member is provided.

In a preferred embodiment, the force transmitting member is a chain or a belt. The belt can be a friction belt or can be a toothed belt. The chain can be a metallic chain or can be a chain from a different material. In a preferred embodiment, the chain is a roller chain, preferably a chain of the type 04B1. In a preferred embodiment, the chain pitch is between 1 mm and 50 mm, preferably between 1 mm and 40 mm, preferably between 1 mm and 30 mm, preferably between 1 mm and 20 mm, preferably between 1 mm and 10 mm, preferably the chain pitch is 6 mm. In a preferred embodiment, the chain width is between 1 mm and 50 mm, preferably between 1 mm and 40 mm, preferably between 1 mm and 30 mm, preferably between 1 mm and 20 mm, preferably between 1 mm and 10 mm, preferably the chain width is 7 mm.

In a preferred embodiment the force transmitting member is a flexible drive shaft. A flexible drive shaft is understood to be a device for transmitting rotary motion between two objects which are not fixed relative to one another. It consists of a rotating wire rope or coil which is flexible but has some torsional stiffness. The flexible drive shaft may be connected with one end to the end of the input shaft and with the other end with an end of the intermediate shaft thereby rotating the intermediate shaft in the same direction as the input shaft.

In a preferred embodiment the force transmitting member comprises an universal joint (often also referred to as universal coupling, U-joint, Cardan joint, Spicer or Hardy Spicer joint, or Hooke's joint). An universal joint is considered to be a joint or coupling connecting rigid rods whose axes are inclined to each other, and is commonly used in shafts that transmit rotary motion. It consists of a pair of hinges located close together, oriented at 90° to each other, connected by a cross shaft. In a preferred embodiment, the force transmitting member comprises two universal joints with a rod arranged inbetween the two universal joints. In such an embodiment, the first universal joint could be connected with the input shaft on one side and the rod on the other side, while the rod is connected to the second universal joint on its other side, the second universal joint being connected to the intermediate shaft on its respective other side.

Thereby the force transmitting member can rotate the intermediate shaft in the same direction as the input shaft.

In a preferred embodiment two intermediated shafts are provided, namely a first intermediate shaft and a second intermediate shaft, whereby
- a force transmitting is connected to the input shaft and the first intermediate shaft, wherein the force transmitting member is configured for rotating the first intermediate shaft in the same direction as the input shaft and
- an auxiliary force transmitting member is connected to the first intermediate shaft and the second intermediate shaft, wherein the auxiliary force transmitting member is configured for rotating the second intermediate shaft in the same direction as the first intermediate shaft.

Hence while in a preferred embodiment the number of force transmitting members provided equals the number of intermediate shafts, designs are also feasible, where several intermediate shafts are present, but only one or some of these intermediate shafts is connected to a force transmitting member and other intermediate shafts are rotated by way of one or more auxiliary force transmitting members arranged between such an intermediate shaft and an intermediate shaft that is driven by an auxiliary force transmitting member.

The auxiliary force transmitting member preferably is a chain or a belt.

According to the invention the at least one force transmitting member is configured for rotating the at least one intermediate shaft in the same direction as the input shaft. This is for example achieved by a belt or a chain that is set around the input shaft and driven by the input shaft and runs onto the intermediate shaft in a straight line from the input shaft and runs around the intermediate shaft to then rotate the intermediate shaft in the same direction as the input shaft.

According to the invention, the at least one intermediate shaft is mating with at least one fixed mating member. In a preferred embodiment, the fixed mating member is provided by way of it being connected to or arranged on or being part of a housing of the gear mechanism that remains stationary in comparison to a movement of the intermediates shaft and/or the input shaft. In a preferred embodiment the mating between the intermediate shaft and the fixed mating member is provided by a gear wheel provided on the intermediate shaft that meshes with a fixed gear wheel that provides the fixed mating member. In a preferred embodiment, the gear wheel provided on the intermediate shaft and the fixed gear wheel, it mashes with, (the fixed mating member) are externally threaded gear wheels. The gear wheel provided on the intermediate shaft hence runs around the outside of the fixed gear wheel (the fixed mating member). However, designs are also feasible, where the fixed gear wheel (the fixed mating member) is an internally threaded gear wheel as they are known from planetary gear mechanisms. In such a design, the gear wheel provided on the intermediate shaft hence runs around the inward facing thread of the fixed gear wheel (the fixed mating member). The mating of the intermediate shaft with the at least one fixed mating member can also be provided by other means. The intermediate shaft can have a wheel that roles along a curved, preferably circular outer or inner surface of the fixed mating member.

The fixed mating member preferably is fixedly attached to a housing of the gear mechanism. The fixed mating member can be an element of the housing that is made as one piece with the housing, for example a shoulder of the housing. The fixed mating member can be fixedly, but releasably attached to the housing, for example by way of bolts and nuts or by way of screws and threads or by way of pins or by way of rivets. The fixed mating member can also be fixed to the housing by way of welding, gluing, interference fit with a step of the housing.

According to the invention, the intermediate shaft is rotatably connected to a rotatable support member. The rotatable connection between the intermediate shaft and the rotatable support member can for example be by way of ball bearings, preferably by two-row ball bearings or by needle bearings or by way of a bush or by way of an electromagnetic field or by way of a magnetic field or by way of high pressure oil sleeves.

In a preferred embodiment the support member is made of aluminum, cast iron or composite materials.

In a preferred embodiment, the support member is a block. In a preferred embodiment, the gear mechanism has one support member and for those embodiments of the invention that have several intermediate shafts, each intermediate shaft is rotatably connected to the one support member.

In a preferred embodiment, the support member is not a disc, but a block. The block may be rectangular, preferably with rounded ends, e.g. end surfaces that form a section of the outer surface of a cylinder. The block preferably is a rectangular block if two intermediate shafts are provided. In such a design, preferably each of the two intermediate shafts would be rotatably connected to the block at one of the ends such that at each end of the block one intermediate shaft would be connected to the block. The block may be of star shape, for example of the shape of a three-legged star, in an embodiment that has three intermediates shafts, whereby each intermediate shaft would be rotatably connected to the end of one of the legs respectively.

In a preferred embodiment, if the length of the support member is understood to be the extend that the support member has in the direction radial to the intermediate shaft and if the width of the support member is understood to be a direction perpendicular to the length, but also radial to the input shaft and the height of the support member is understood to be the direction perpendicular to the length and perpendicular to the width, but co-axial or parallel to the axial extend of the input shaft, in such a set of coordinate it is preferred if the width and/or the height of the support member stay the same for the majority of the extend in the direction of the length of the support member. Preferably the width and/or the height of the support member only changes at the end of the support member. This design rule can be applied to a support member that has the shape of a block or can be applied to a support member that is star shaped, whereby the design rule would be applied for each leg of the star.

In a preferred embodiment, the support member is arranged on one side of the force transmitting member. In a preferred embodiment any force transmitting member present is provided on one side of the support member. In a preferred embodiment the support member does not have a protrusion that extends from one side of a force transmitting member into the direction of the other side of the force transmitting member. In a preferred embodiment the support block is arranged on one side of the force transmitting member and does not encapsulate the force transmitting member. In a preferred embodiment the support member is arranged on one side of all force transmitting members present and does not encapsulate any force transmitting member present.

The output shaft of the gear mechanism according to the invention can be a solid shaft, but can also be a pipe. The output shaft can be of metal, but can also be of other materials, like plastic materials, composite materials or even wood.

The output shaft can have a continuous outer shape, for example the outer shape of a round cylinder. Other outer shapes of the output shaft are feasible too, like for example polygonal outer shapes. Instead of a continuous outer shape, the output shaft also can have interruptions of a continuous outer shape, for example can have steps inbetween sections, whereby in a preferred embodiment the individual section of the output shaft that borders the step has a continuous shape. Steps can be used to position bearings for example.

In a preferred embodiment, the output shaft is arrange co-axial or parallel to the input shaft. In a preferred embodiment, the output shaft is arranged at a distance from the input shaft when viewed in the direction of the longitudinal axis of the input shaft. Preferably the output shaft is not designed as a hollow shaft that contains the or parts of the input shaft. Preferably the input shaft is not designed as a hollow shaft that contains the or parts of the output shaft.

In a preferred embodiment where the gear mechanism has a housing, the input shaft extends into the housing from one side of the housing and the output shaft extends out of the housing on a different side of the housing.

According to the invention, the support member is rotatable about the input shaft. Designs are feasible, where the support member has no direct contact to the input shaft. In a preferred embodiment, the input shaft is rotatably supported inside the support member, for example by way of a bearing arranged in a recess of the support member, whereby the input shaft is supported by the bearing. Designs are also feasible where instead of the bearing a bush is provided.

According to the invention the support member is connected to the output shaft. In a preferred embodiment, the connection of the support member to the output shaft is such that support member and output shaft rotate in unison. In a preferred embodiment, the output shaft can be one piece with the support member, for example made by casting or made by CNC-machining. The output shaft can be welded to the support member. The output shaft can be glued to the support member. The support member can have a recess in which the output shaft sits with interference fit. The output shaft can be bolted to the support member or can be attached to the support member by way of wedges or keys.

In a preferred embodiment, the input shaft is rotatably supported in the support member.

In a preferred embodiment, the gear mechanism comprises two intermediate shafts. In a preferred embodiment, the two intermediate shafts are positioned on opposite sides of the input shaft.

In a preferred embodiment, the input shaft comprises at least one input shaft output member configured for rotating with the input shaft. In a preferred embodiment the input shaft output member is an external gear. In a preferred embodiment, the input shaft output member is made as one piece with the input shaft, for example by way of CNC-machining. In a preferred embodiment the input shaft output member is a separate part to the input shaft, but fixedly attached to the input shaft by way of screws, wedges, gluing, welding or interference fit.

In a preferred embodiment the input shaft output member is made from metal, plastic or wood. In a preferred embodiment the input shaft output member is made from the same material as the input shaft.

In a preferred embodiment, the at least one intermediate shaft comprises an intermediate shaft input member configured for rotating with the intermediate shaft.

In a preferred embodiment, the intermediate shaft input member is an external gear.

In a preferred embodiment, the intermediate shaft input member is made as one piece with the intermediate shaft, for example by way of CNC-machining. In a preferred embodiment the intermediate shaft input member is a separate part to the intermediate shaft, but fixedly attached to the input shaft by way of screws, wedges, gluing, welding or interference fit.

In a preferred embodiment the intermediate shaft input member is made from metal, plastic or wood. In a preferred embodiment the intermediate shaft input member is made from the same material as the intermediate shaft.

In a preferred embodiment, the at least one intermediate shaft comprises at least one intermediate shaft output member configured for rotating with the intermediate shaft and mating with the at least one fixed mating member. In a preferred embodiment, the at least one intermediate shaft output member and the at least one fixed mating member are external gears. In a preferred embodiment, the intermediate shaft output member is made as one piece with the intermediate shaft, for example by way of CNC-machining. In a preferred embodiment the intermediate shaft output member is a separate part to the intermediate shaft, but fixedly attached to the input shaft by way of screws, wedges, gluing, welding or interference fit.

In a preferred embodiment the intermediate shaft output member is made from metal, plastic or wood. In a preferred embodiment the intermediate shaft output member is made from the same material as the intermediate shaft.

In a preferred embodiment the support member is fixed to the output shaft.

In a preferred embodiment the intermediate shaft extends through the rotatable support member. In a preferred embodiment a bearing is arranged within the support member with the outer ring of the bearing being connected to the support member and arranged in a recess or a hole of the support member, while the intermediate shaft is connected to the inner ring of the bearing.

In a preferred embodiment the output shaft extends through a fixed mating member. In a preferred embodiment, the at least one intermediate shaft is mating with this fixed mating member. In a preferred embodiment, the fixed mating member is provided by way of it being connected to or arranged on or being part of a housing of the gear mechanism that remains stationary in comparison to an movement of the intermediates shaft and/or the output shaft. In a preferred embodiment the mating between the intermediate shaft and the fixed mating member is provided by a gear wheel provided on the intermediate shaft that meshes with a fixed gear wheel that provides the fixed mating member. In a preferred embodiment, the gear wheel provided on the intermediate shaft and the fixed gear wheel, it mashes with, (the fixed mating member) are externally threaded gear wheels. The gear wheel provided on the intermediate shaft hence runs around the outside of the fixed gear wheel (the fixed mating member). However, designs are also feasible, where the fixed gear wheel (the fixed mating member) is an internally threaded gear wheel as they are known from planetary gear mechanisms. In such a design, the gear wheel provided on the intermediate shaft hence runs around the inward facing thread of the fixed gear wheel (the fixed mating member). The mating of the intermediate shaft with the at least one fixed mating member can also be provided by other means. The intermediate shaft can have a wheel that roles along a curved, preferably circular outer or inner surface of the fixed mating member.

The fixed mating member preferably is fixedly attached to a housing of the gear mechanism. The fixed mating member can be an element of the housing that is made as one piece with the housing, for example a shoulder of the housing. The fixed mating member can be fixedly, but releasably attached to the housing, for example by way of bolts and nuts or by way of screws and threads or by way of pins or by way of rivets. The fixed mating member can also be fixed to the housing by way of welding, gluing, interference fit with a step of the housing.

In a preferred embodiment the inputs shaft extends through a fixed mating member. In a preferred embodiment, the at least one intermediate shaft is mating with this fixed mating member. In a preferred embodiment, the fixed mating member is provided by way of it being connected to or arranged on or being part of a housing of the gear mechanism that remains stationary in comparison to an movement of the intermediates shaft and/or the input shaft. In a preferred embodiment the mating between the intermediate shaft and the fixed mating member is provided by a gear wheel provided on the intermediate shaft that meshes with a fixed gear wheel that provide the fixed mating member. In a preferred embodiment, the gear wheel provided on the intermediate shaft and the fixed gear wheel it mashes with (the fixed mating member) are externally threaded gear wheels. The gear wheel provided on the intermediate shaft hence runs around the outside of the fixed gear wheel (the fixed mating member).

However, designs are also feasible, where the fixed gear wheel (the fixed mating member) is an internally threaded gear wheel as they are known from planetary gear mechanisms. In such a design, the gear wheel provided on the intermediate shaft hence runs around the inward facing thread of the fixed gear wheel (the fixed mating member). The mating of the intermediate shaft with the at least one fixed mating member can also be provided by other means. The intermediate shaft can have a wheel that roles along a curved, preferably circular outer or inner surface of the fixed mating member.

The fixed mating member preferably is fixedly attached to a housing of the gear mechanism. The fixed mating member can be an element of the housing that is made as one piece with the housing, for example a shoulder of the housing. The fixed mating member can be fixedly, but realizably attached to the housing, for example by way of bolts and nuts or by way of screws and threads or by way of pins or by way of rivets. The fixed mating member can also be fixed to the housing by way of welding, gluing, interference fit with a step of the housing.

In a preferred embodiment the force transmitting member is a chain or a belt.

In a preferred embodiment the gear mechanism comprises a housing where the first shaft (input shaft) extends into the housing and the second shaft (output shaft) extends out of the housing. The housing can be of metal, for example aluminum.

The housing can be machined, e.g. by way of CNC-machining. The housing can be cast. The housing can have a main body and a lid that closes the main body. The housing can contain lubrication.

In a preferred embodiment the at least one fixed mating element is fixed to the housing.

In a preferred embodiment, the support member is made from Aluminum, preferably from AlMg. In a preferred embodiment, gears that are present in the gear mechanism are heat treated. The sprockets preferably are of class 04B1. In a preferred embodiment, bearings that are present are in C version. In a preferred embodiment the connections between the parts are done thermally (folding) or by cooling (liquid nitrogen). In a preferred embodiment the metal used for the shafts is titanium steel.

In a preferred embodiment the support member has a counter weight attached to it or formed as one-piece with the support member. In a preferred embodiment the gear mechanism according to the invention has one intermediate shaft rotatably connected to the rotatable support member and a counter weight attached to the support member or formed as one-piece with the support member, whereby the intermediate shaft is connected to the support member on one side of the longitudinal axis of the input shaft and/or on one side of the longitudinal axis of the output shaft and the counterweight is arranged on the opposite side of the longitudinal axis of the input shaft and/or on the opposite side of the longitudinal axis of the output shaft such that the counter weight balances or reduces any imbalance or unbalanced mass that is introduced by the intermediate shaft being connected to the support member.

In a preferred embodiment, a bearing, preferably a ball bearing or a bush bearing is provided to support the input shaft in the housing. In a preferred embodiment, a bearing, preferably a ball bearing or a bush bearing is provided to support the output shaft in the housing.

In a preferred embodiment of those embodiments where a roller chain is provided, for example as first force transmitting member or second force transmitting member or auxiliary force transmitting member, a tensioning sprocket is provided and the chain is arranged to engage with the tensioning sprocket. The tensioning sprocket has a modified base between the teeth of the sprocket. The modified base has an engaging member for engagement with a bush of the roller chain. The modified base furthermore has radial tensioning means that apply a radially outward pointing force to the engaging member, when the engaging member is displace radially inward. The radial tensioning means can be coil springs that are arranged in radial bores of the sprocket. The tensioning sprocket can tension the roller chain and can be used to counter-act tolerances that might occur in the manufacturing of the roller chain.

In a preferred embodiment, a gear wheel provided as part of the gear mechanism according to the invention, for example an intermediate shaft output member, has radially moveable weights. In a preferred embodiment at least one of the gear wheels provided has

- a first weight moveably arranged on a first guide, the first guide being arranged to point in the radial direction, a tension means being in contact with the first weight such that the tension means is tensioned as the first weight moves radially outward along the first guide, and
- a second weight moveably arranged on a second guide, the second guide being arranged to point in the radial direction, a tension means being in contact with the second weight such that the tension means is tensioned as the second weight moves radially outward along the second guide.

The first guide and/or the second guide can be a radially arranged bar that passes through the first weight or the second weight respectively. The first guide and/or the second guide can be a radially outward pointing pair of rails with the first weight or the second weight respectively being arranged between a respective pair of rails and travelling along this pair of rails.

The tension means can be a coil spring that is arranged radially outward of the weight and is compressed as the weight moves radially outward. The tension means can be a coil spring attached to a hub of the gear wheel and attached to the weight, the coil spring being stretched as the weight moves radially outward.

In a preferred embodiment the weights of the gear wheel are arranged equally spaced over the circumference of the gear wheel. If two weights are provided, these preferably are arranged 180° apart. If three weights are provided, these are preferably arranged 120° apart etc.

Providing weights for the gear wheel can make the gear wheel act as a dynamic flywheel. A gear wheel as modified in this embodiment will have a first moment of inertia at lower turnings speeds and a second, different moment of inertia at a second, higher turning speed as the weights move outwards with increasing turning speed.

The present invention will become apparent from the detailed description given below. The detailed description and specific examples disclose preferred embodiments of the invention by way of illustration only. Those skilled in the art understand from guidance in the detailed description that changes and modifications may be made within the scope of the invention.

Hence, it is to be understood that the herein disclosed invention is not limited to the particular component parts of the device described or steps of the methods described since such device and method may vary. It is also to be understood that the terminology used herein is for purpose of describing particular embodiments only, and is not intended to be limiting. It should be noted that, as used in the specification and the appended claim, the articles "a", "an" and "the" are intended to mean that there are one or more of the elements unless the context explicitly dictates otherwise. Thus, for example, reference to "a unit" or "the unit" may include several devices, and the like. Furthermore, the words "comprising", "including", "containing" and similar wordings does not exclude other elements or steps.

BRIEF DESCRIPTION OF THE DRAWINGS

The above objects, as well as additional objects, features and advantages of the present invention, will be more fully appreciated by reference to the following illustrative and non-limiting detailed description of example embodiments of the present invention, when taken in conjunction with the accompanying figures.

FIG. 18 shows a schematic side view of a modified gear wheel with the weights in a first position.

FIG. 19 shows a schematic side view of a modified gear wheel with the weights in a second position.

FIG. 20 shows a schematic side view of a modified sprocket with roller chain arranged around the sprocket.

FIG. 21 shows a schematic front view of a modified sprocket with roller chain arranged around the sprocket of FIG. 20.

DETAILED DESCRIPTION

The present invention will now be described with reference to the accompanying drawings, in which preferred example embodiments of the invention are shown. The invention may, however, be embodied in other forms and should not be construed as limited to the herein disclosed embodiments. The disclosed embodiments are provided to fully convey the scope of the invention to the skilled person.

Figure 1:
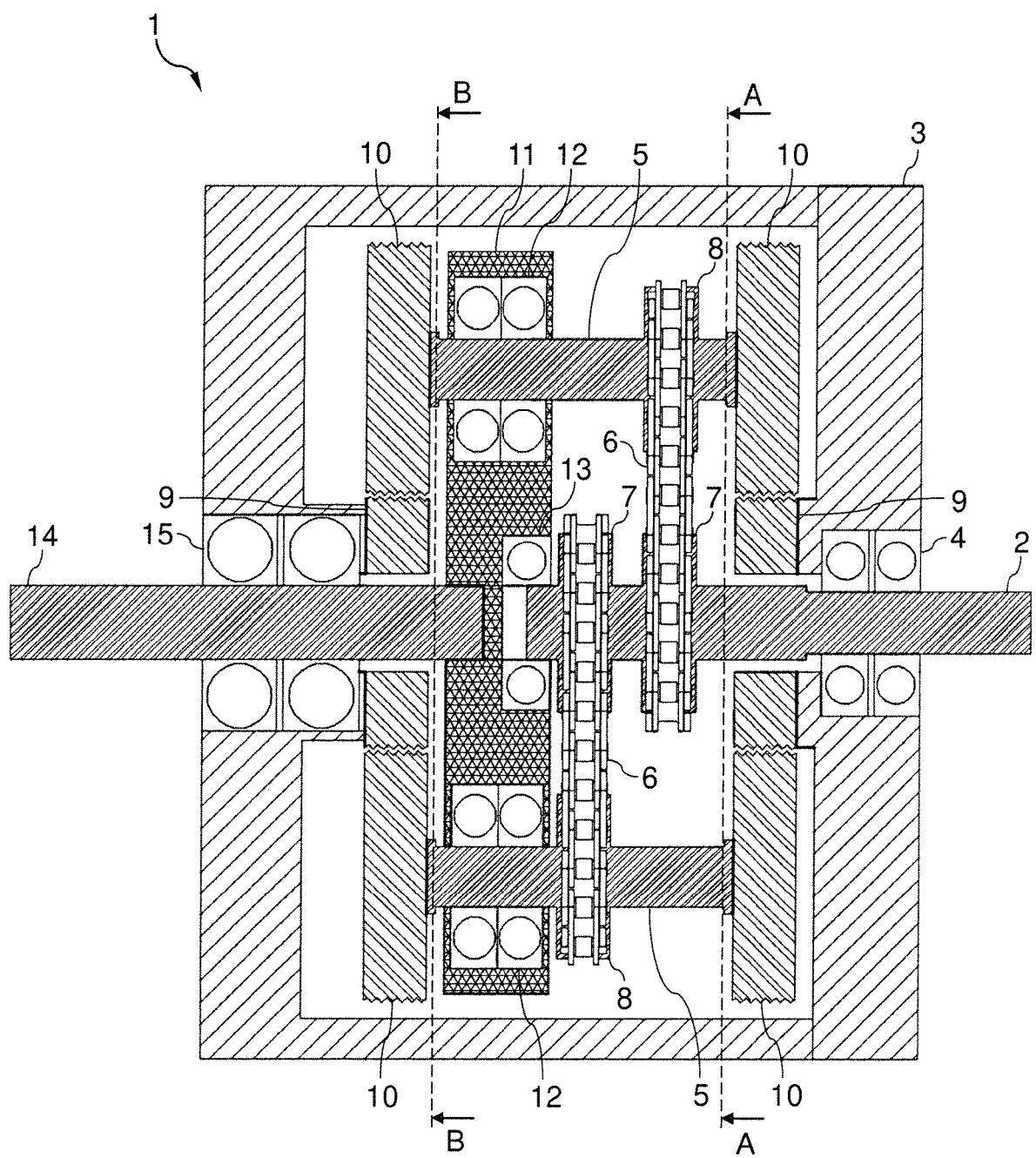
FIG. 1 shows a cross sectional view through a center of a first embodiment of the gear mechanism.

Referring initially to FIG. 1, a cross-section through a first embodiment of a gear mechanism 1 is shown. The gear mechanism 1 comprises an input shaft 2. The input shaft 2 may be connected to a rotating shaft from e.g. a motor. The gear mechanism 1 may be housed in a housing 3, and the input shaft 2 may extend into the housing 3. To rotatably support the input shaft 2 in the housing 3, the housing 3 may be provided with an input shaft bearing 4. The input shaft bearing 4 may be one or more ball bearings, lubricated sealing rings or similar means known in the art of supporting a rotating shaft.

The gear mechanism 1 further comprises an intermediate shaft 5. The illustrated embodiment comprises two intermediate shafts 5, but the gear mechanism 1 may as such comprise any number of intermediate shafts 5. In order to balance the gear mechanism, two or more intermediate shafts could be distributed evenly around the input shaft 2. E.g. two intermediate shafts 5 could be spaced apart 180° about the input shaft 2 (as in the illustrated embodiment), three intermediate shafts could be spaced apart 120° about the input shaft, etc. In order to keep the number of components (and weight) to a minimum, two intermediate shafts 5 may be preferred.

The two intermediate shafts 5 of the illustrated embodiment are positioned on opposite sides of the input shaft 2. This provides a gear mechanism 1 that is balanced and e.g. vibration may be minimized. An intermediate shaft 5 is parallel and offset from the input shaft 2, i.e. the rotation axis of an intermediate shaft 5 has the same direction as the rotation axis of the input shaft 2, but the two axes are not coincident.

A force transmitting member 6 connects the input shaft 2 and the at least one intermediate shaft 5. The force transmitting member 6 may be any member capable of rotating the intermediate shaft 5 in the same direction as the input shaft 2. If the rotation of the input shaft 2 is clockwise, the rotation of the intermediate shaft 5 is also clockwise. The force transmitting member 6 is in the illustrated embodiment a chain, but may also be a belt, a wire or any member configured for transmitting a rotational motion from one shaft to another. The force transmitting member 6 could as such be an internal gear mating with the input shaft 2 and intermediate shaft 5.

The weight of the force transmitting member 6 plays a role in the effect of the gear mechanism, and e.g. a chain may be both heavier and have less power loss when transmitting a force compared to e.g. a belt, such that a chain comprising metal links may be preferred. The force transmitting member 6 is also preferably exterior to the input shaft 2 and the intermediate shaft 5. When the force transmitting member 6 is spun by the input shaft 2, a centrifugal force is created. This centrifugal force increases the efficiency of the gear mechanism.

The illustrated embodiment comprises two intermediate shafts 5, and as such, two force transmitting members 6 connect the input shaft 2 to the two intermediate shafts 5. The force transmitting members 6 are independent of each other, and may be positioned spaced apart on the input shaft 2.

In order to transmit the rotational force from the input shaft 2 to the force transmitting member 6, the input shaft 2 may be provided with an input shaft output member 7.

The input shaft output member 7 is configured for rotating with the input shaft 2, and connection with the force transmitting member 6. The input shaft output member 7 may simply be a portion of the input shaft 2, or it may be a separate member. The input shaft output member 7 may have a radius greater than the input shaft 2. The input shaft output member 7 may be fixed to the input shaft 2, and is in the illustrated embodiment an external gear configured to mate with the force transmitting member 6.

An intermediate shaft 5 may correspondingly be provided with an intermediate shaft input member 8 to mate with the force transmitting member 6. The intermediate shaft input member 8 is configured for rotating with the intermediate shaft 5, and connection with the force transmitting member 6. The intermediate shaft input member 8 may simply be a portion of the intermediate shaft 5, or it may be a separate member. The intermediate shaft input member 8 may have a radius greater than the intermediate shaft 5. The intermediate shaft input member 8 may be fixed to the intermediate shaft 5, and is in the illustrated embodiment an external gear configured to mate with the force transmitting member 6.

The intermediate shaft 5 is mating with fixed mating members 9. One intermediate shaft 5 may mate with one or more mating members 9. In the first illustrated embodiment, the two intermediate shafts 5 both mate with two mating members 9. The intermediate shafts 5 of the first embodiment mate with the mating members 9 at distal ends of the intermediate shafts 5. The gear mechanism 1 may comprise at least one fixed mating member 9, and one or more of the at least one fixed mating member 9 may be fixed to the housing 3. The fixed mating members 9 do not rotate or move relative to the input shaft 2 and the intermediate shaft 5, and in the illustrated embodiment, the fixed mating members 9 are positioned on the inside of the housing 3. The input shaft 2 may extend through one fixed mating member 9, and more specifically, the input shaft 2 may extend through the centre of a fixed mating member 9. The fixed mating members 9 are in the illustrated embodiment external gears. As the intermediate shaft 5 is rotated by the force transmitting member 6 and mates with the fixed mating members 9, the intermediate shaft 5 is consequently driven around the fixed mating members 9. The input shaft 2 is positioned in the centre of one of the fixed mating members 9, and as the input shaft 2 is rotated, the intermediate shaft 5 is rotated both around itself and consequently also around the input shaft 2. This is also described and illustrated with reference to FIG. 2.

An intermediate shaft 5 may comprise at least one intermediate shaft output member configured for rotating with the intermediate shaft 5 and mating with a fixed mating member 9. The intermediate shaft output member 10 may be an external gear, as in the illustrated embodiment. The intermediate shaft output member 10 may have a radius greater than the intermediate shaft 5, and the intermediate shaft output member may be fixed to the intermediate shaft 5. The intermediate shaft output member 10 may also simply be a portion of the intermediate shaft 5. If the intermediate shaft 5 is configured for mating with two fixed mating members 9, the intermediate shaft 5 may comprise two intermediate shaft output member 10 as in the illustrated embodiment. The two intermediate shaft output members 10 are in the illustrated embodiment positioned at distal ends of the intermediate shaft 5.

Figure 2:
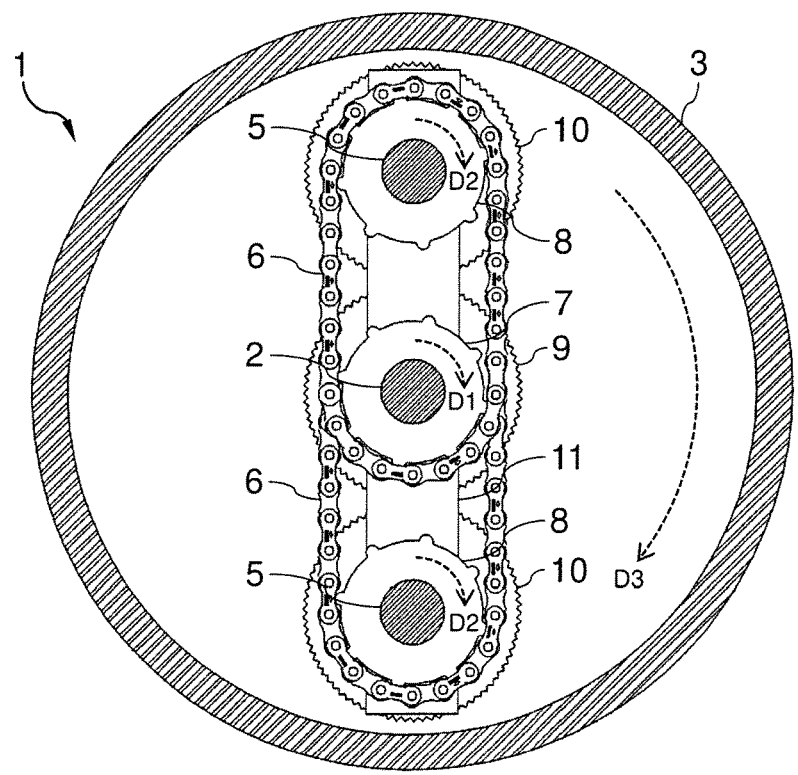
FIG. 2 shows a cross sectional view of the plane A-A indicated in FIG. 1.

The intermediate shaft 5 is further rotatably connected to a rotatable support member 11. The support member 11 is configured to rotate about the input shaft 2, i.e. the support member 11 has a rotation axis that is coincident with the rotation axis of the input shaft 2. The intermediate shaft 5 is rotatably connected to the support member 11 off-center, such that when the intermediate shaft 5 is rotated about the fixed mating members 9 and input shaft 2, the support member 11 is also rotated about the input shaft 2. The support member 11 may be shaped similarly to a disc or an arm, where the at least one intermediate shaft 5 may be connected to the support member 11 at an outer periphery. The support member 11 of the illustrated embodiment is shaped similar to an arm, as shown in FIG. 2.

The intermediate shaft 5 may extend through the support member 11, and the intermediate shaft 5 may as such mate with fixed mating members 9 at both sides of the support member 11. The intermediate shaft 5 may be rotatably supported in the support member 11 by means of an intermediate shaft bearing 12. The intermediate shaft bearing 12 may be one or more ball bearings, lubricated sealing rings or similar means known in the art of supporting a rotating shaft.

The support member 11 is rotatable about the input shaft 2, and may also be rotatably connected to the input shaft 2. The support member 11 may comprise a central bearing 13 where the input shaft 2 is rotatably supported. The input shaft 2 may as such be supported at two independent locations; at the input shaft bearing 4 on the housing 3, and at the central bearing 13 of the support member 11.

The support member 11 is connected to an output shaft 14. The connection between the support member 11 and the output shaft 14 may be direct as in the illustrated embodiment, or may be by gears and similar means. The support member 11 may be fixed to the output shaft 14, as in the illustrated embodiment. If there is a direct connection between the support member 11 and the output shaft 14, the output shaft 14 is positioned in the center of the support member 11. As such, the rotation axis of the output shaft 14 coincides with the rotation axis of the input shaft 2. The output shaft 14 may be rotatably supported by an output shaft bearing 15. In the illustrated embodiment, the output shaft bearing 15 is provided in the housing 3, and the output shaft bearing 15 may be one or more ball bearings, lubricated sealing rings or similar means known in the art of supporting a rotating shaft.

Figure 3:
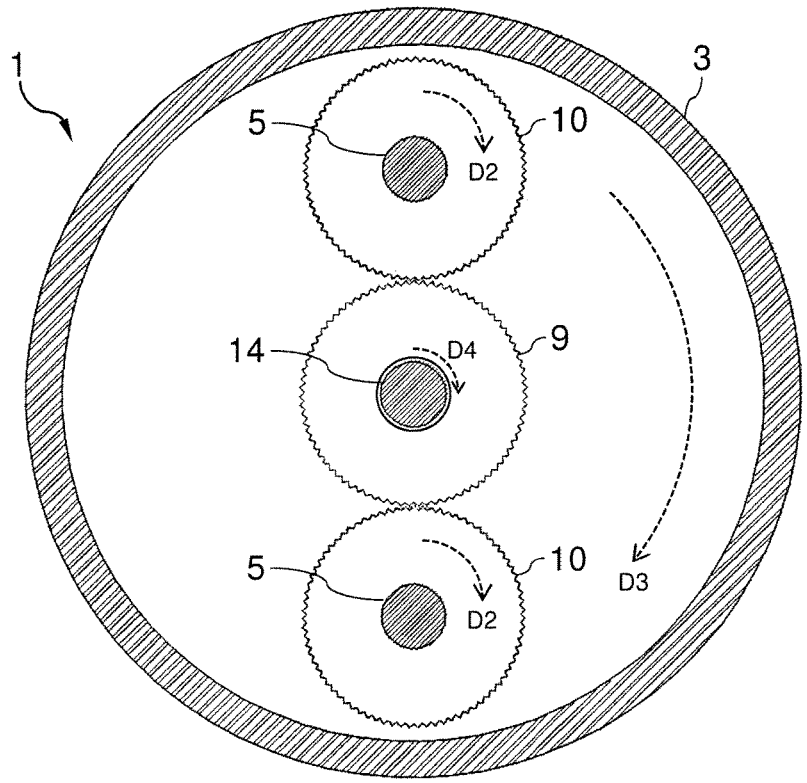
FIG. 3 shows a cross sectional view of the plane B-B indicated in FIG. 1.

Referring now to FIGS. 2 and 3, a view of the plane A-A from FIG. 1 is shown in FIG. 2, and a view of the plane B-B from FIG. 1 is shown in FIG. 3. Each force transmitting member 6 is exterior to the input shaft 2 and the respective intermediate shaft 5. As the input shaft 2 of the gear mechanism 1 is rotated in the clockwise direction D1, the intermediate shafts 5 are correspondingly rotated in the clockwise direction D2. This may be caused by the force transmitting members 6 mating with the input shaft output member 7s and the intermediate shaft input members 8. As previously mentioned, the illustrated embodiment comprises two input shaft output members 7, two force transmitting member 6, two intermediate shafts 5 and two intermediate shaft input members 8.

Because an intermediate shaft 5 mates with a fixed mating member 9 by e.g. an intermediate shaft output member 10, the intermediate shaft 5 is rotated about the input shaft 2 in the clockwise direction D3. The support member 11, being rotatably connected to the intermediate shaft 5, is thus also rotated in the clockwise direction D3. The output shaft 14 is connected to the support member 11 and is rotated in a corresponding clockwise direction D4.

The increased torque of the output shaft 14 compared to that of the input shaft 2 is due to a number of factors. The relationship between the radius of the input shaft output member 7 and the radius of the intermediate shaft input member 8 may be adjusted. In the first embodiment, the input shaft output member 7 and the intermediate shaft input member 8 have corresponding radiuses. A larger radius of the input shaft output member 7 would increase the RPM of the output shaft 14, but decrease the torque. Correspondingly, a smaller radius of the input shaft output member 7 would decrease the RPM of the output shaft 14 and increase the torque.

The relationship between the radius of the intermediate shaft output member 10 and the radius of the fixed mating member 9 may also be adjusted. In the first embodiment, the intermediate shaft output member 10 and the fixed mating member 9 have corresponding radiuses. A larger radius of the intermediate shaft output member 10 would increase the RPM of the output shaft 14, but decrease the torque. Correspondingly, a smaller radius of the intermediate shaft output member 10 would decrease the RPM of the output shaft 14 and increase the torque.

Moreover, the mass of the force transmitting members 6 affect the output power of the output shaft 14. The energy loss through the gear mechanism 1 is lower with force transmitting members 6 with higher mass than force transmitting members 6 with lower mass. This could be due to the centrifugal forces at play as the force transmitting members 6 are rotated around the input shaft 2 and the intermediate shafts 5, while the intermediate shafts 5 are rotated around the input shaft 2. The gear mechanism 1 has as such proven to be highly effective. The force transmitting members 6 could be provided with more mass to increase the efficiency of the gear mechanism 1. A chain could e.g. be equipped with thicker and heavier links, a belt could be provided with weights, and the force transmitting members 6 could in general be made from materials with a high mass density.

Figure 4:
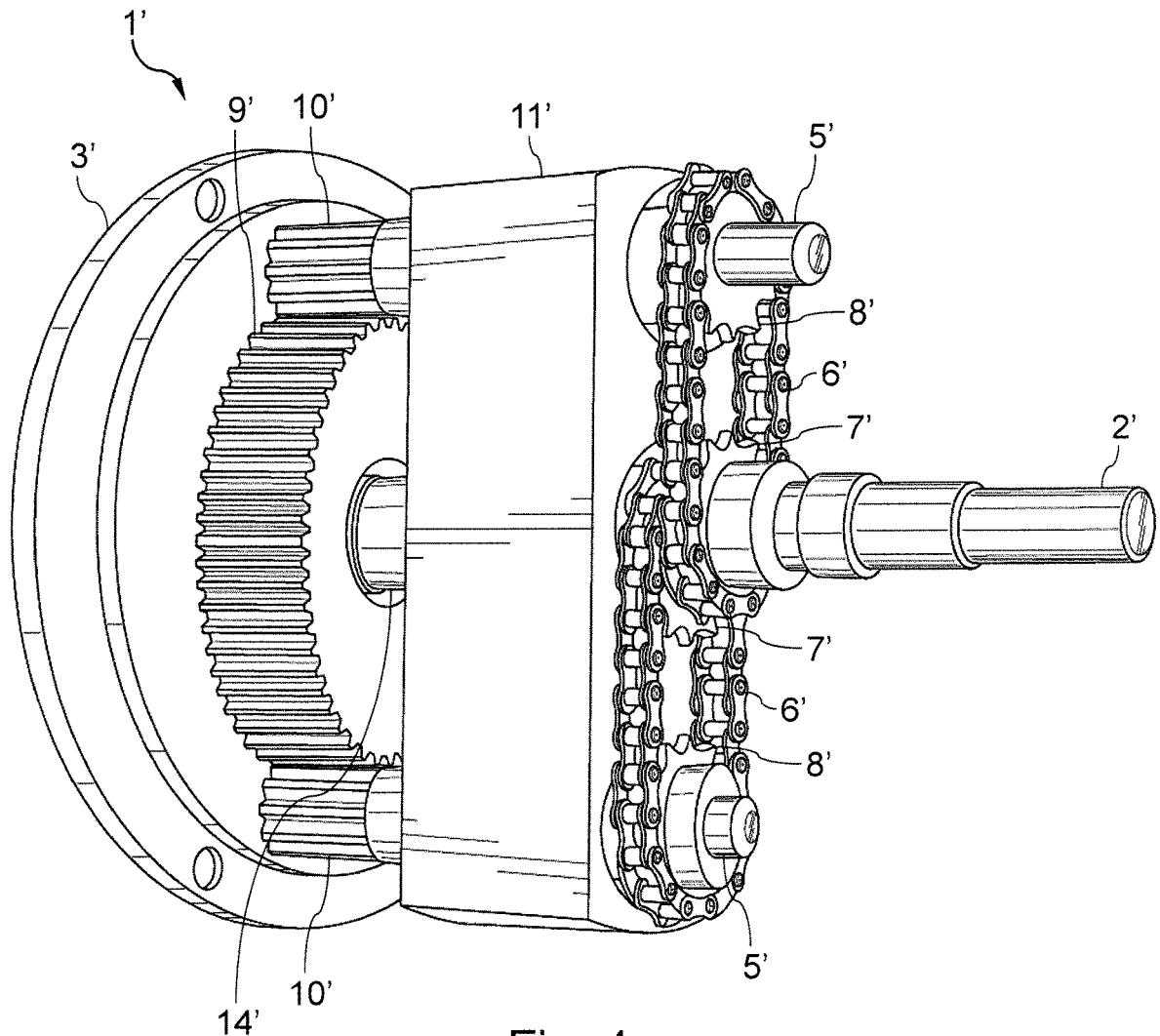
FIG. 4 shows a perspective view of parts of a second embodiment of the gear mechanism.
Figure 5:
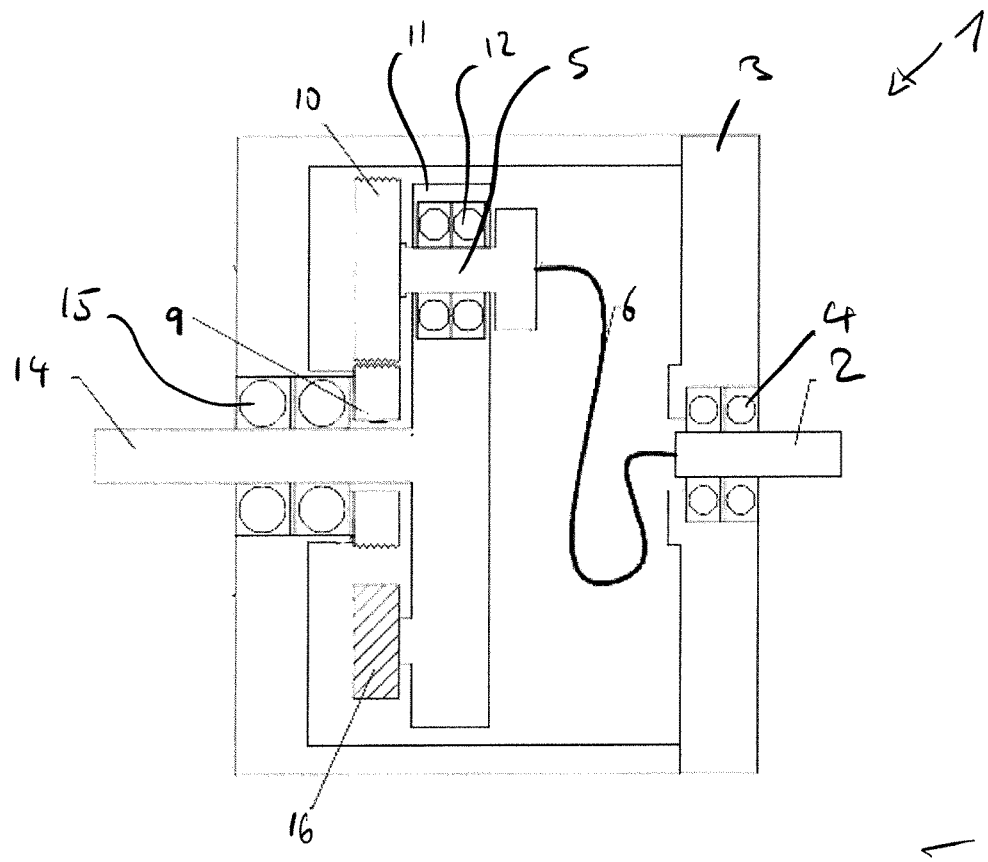
FIG. 5 shows a schematic sectional view of a second embodiment of the gear mechanism.
Figure 6:
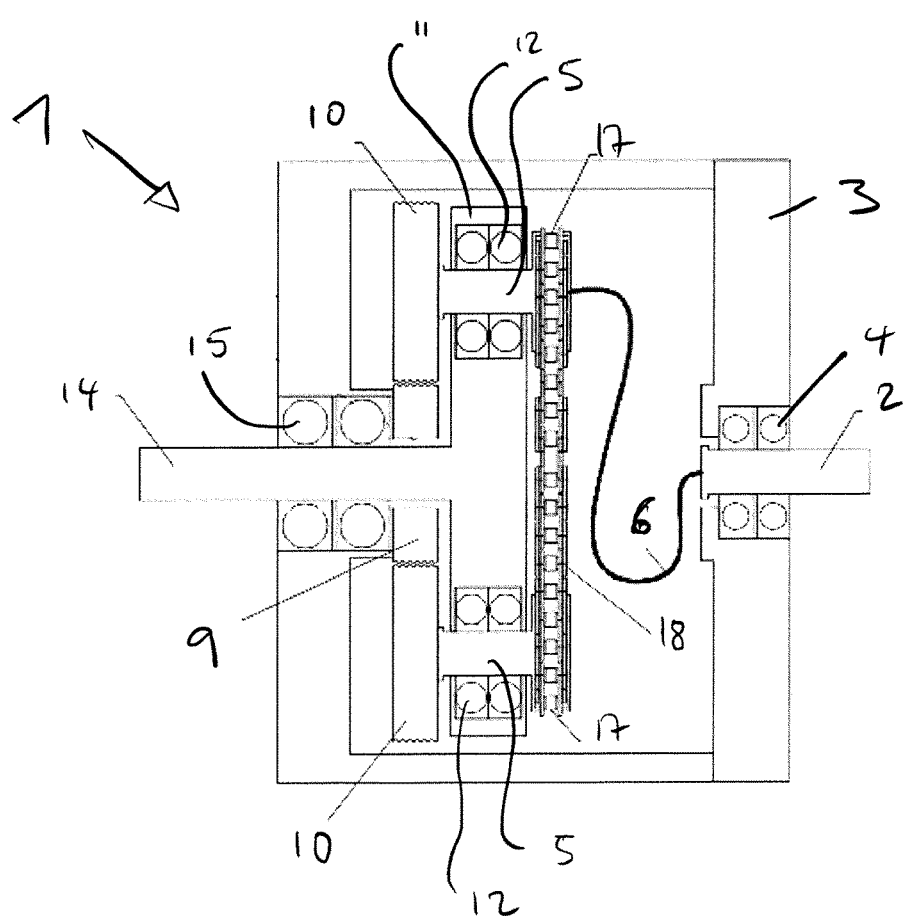
FIG. 6 shows a schematic sectional view of a second embodiment of the gear mechanism.

Referring now to FIG. 4, a second embodiment of a gear mechanism 1' is shown. This embodiment comprises fewer parts than the first illustrated embodiment, and may as such be lighter and less expensive to manufacture and maintain. The gear mechanism 1' of the second embodiment may be suited for connection to motors with a lower output power than the gear mechanism of the first embodiment, because the intermediate shafts 5' are mating with only one fixed mating member 9'.

To avoid describing similar features and principles twice, the features and principles of the first embodiment applies to the second embodiment unless otherwise noted.

In FIG. 4, a part of the housing 3' is shown, the rest of the housing 3' has been removed for illustrating purposes. The gear mechanism 1' comprises an input shaft 2', and the input shaft 2' may extend into the housing through an input shaft bearing, but in the second embodiment, the input shaft 2' may not extend through a fixed mating member. The gear mechanism 1' thus comprises only one fixed mating member 9', and in the second embodiment the fixed mating member 9' is a circular portion of the housing 3' comprising teeth. The fixed mating member 9' is as such an external gear provided on the housing 3'. The output shaft 14' extends through the centre of the fixed mating member 9'.

Alternatively, the fixed mating member 9' could be provided on the opposite side of the support member 11', i.e. at the other distal end of the intermediate shaft 5'. The input shaft 2' would thus extend through a fixed mating member 9', but the output shaft 14' would not. With such a design, the intermediate shafts 5' would not need to extend through the support member 11'.

Similar to the first embodiment, the intermediate shafts 5' of the second embodiment are parallel and offset from the input shaft 2'. A first force transmitting member 6' connects the input shaft 2' and a first intermediate shaft 5', and a second force transmitting member 6' connects the input shaft 2' and a second intermediate shaft 5'. The intermediate shafts 5' are positioned on opposite sides of the input shaft 2' and are rotatably connected to the support member 11'. In the second embodiment, the support member 11' is connected to the intermediate shaft 5' generally in the middle of the intermediate shaft 5'. The input shaft 2' is provided with two input shaft output members 7' configured for connection with force transmitting members 6'.

The intermediate shafts 5' are provided with intermediate shaft input members 8' also configured for connection with the force transmitting members 6'.

The intermediate shafts 5' extend through the support member 11', and are mating with the fixed mating member 9'. In the second embodiment, the intermediate shaft output members 10' are portions of the intermediate shafts 5' comprising teeth, and are as such an external gears. The intermediate shaft output members 10' have a radius that is smaller than the radius of the fixed mating member 9'.

The person skilled in the art realizes that the present invention is not limited to the preferred embodiments described above. The person skilled in the art further realizes that modifications and variations are possible within the scope of the appended claims.

Additionally, variations to the disclosed embodiments can be understood and effected by the skilled person in practicing the claimed invention, from a study of the drawings, the disclosure, and the appended claims.

For the embodiments of FIGS. 5 to 17 like parts have been designated with the same reference signs as used in FIGS. 1 to 4.

In the embodiments of FIGS. 5 to 17, the intermediate shaft 5 (FIG. 5, FIG. 7, FIG. 9, FIG. 12, FIG. 13, FIG. 17) or the intermediate shafts 5 (FIG. 6, FIG. 8, FIG. 10, FIG. 11, FIG. 14, FIG. 15, FIG. 16) have been shortened in comparison to the intermediate shaft 5 shown in the embodiments of FIGS. 1 to 4. The embodiments of FIGS. 5 to 17 hence only have one output member 10 per intermediate shaft, namely at the end of the respective intermediate shaft 5 that is closer to the output shaft 14. While the embodiment of FIGS. 1 to 3 has an output member 10 at each end of the respective intermediate shaft 5 and hence also has an output member 10 closer to the input shaft 2, this output member 10 at the end of the intermediate shaft 5 that is closer to the input shaft 2 is missing in the embodiments of FIGS. 5 to 17. Likewise, the embodiments of FIGS. 5 to 17 only have one fixed mating member 9, namely the fixed mating member 9 that surrounds the output shaft 14.

In the embodiments of FIGS. 5 and 6 and 9 to 12 a flexible drive shaft is provided as force transmitting member 6. One end of the flexible drive shaft is attached to the endface of the input shaft 2; the opposite end of the flexible drive shaft is attached to the endface of the intermediate shaft 5.

In the embodiments of FIGS. 5, 7, 9, 12, 13 and 17 the support member 11 is provided with a counter weight 16.

In the embodiments of FIGS. 6 8, 10, 11, 14, 15 and 16 there are provided two intermediate shafts 5. Each intermediate shaft 5 has an auxiliary drive gear wheel 17. A auxiliary force transmitting member 18 in the form of a chain is provided that engages with the auxiliary gear wheels 17 and drives the one intermediate shaft 5 to rotate in the same rotational direction as the other intermediate shaft 5.

Figure 7:
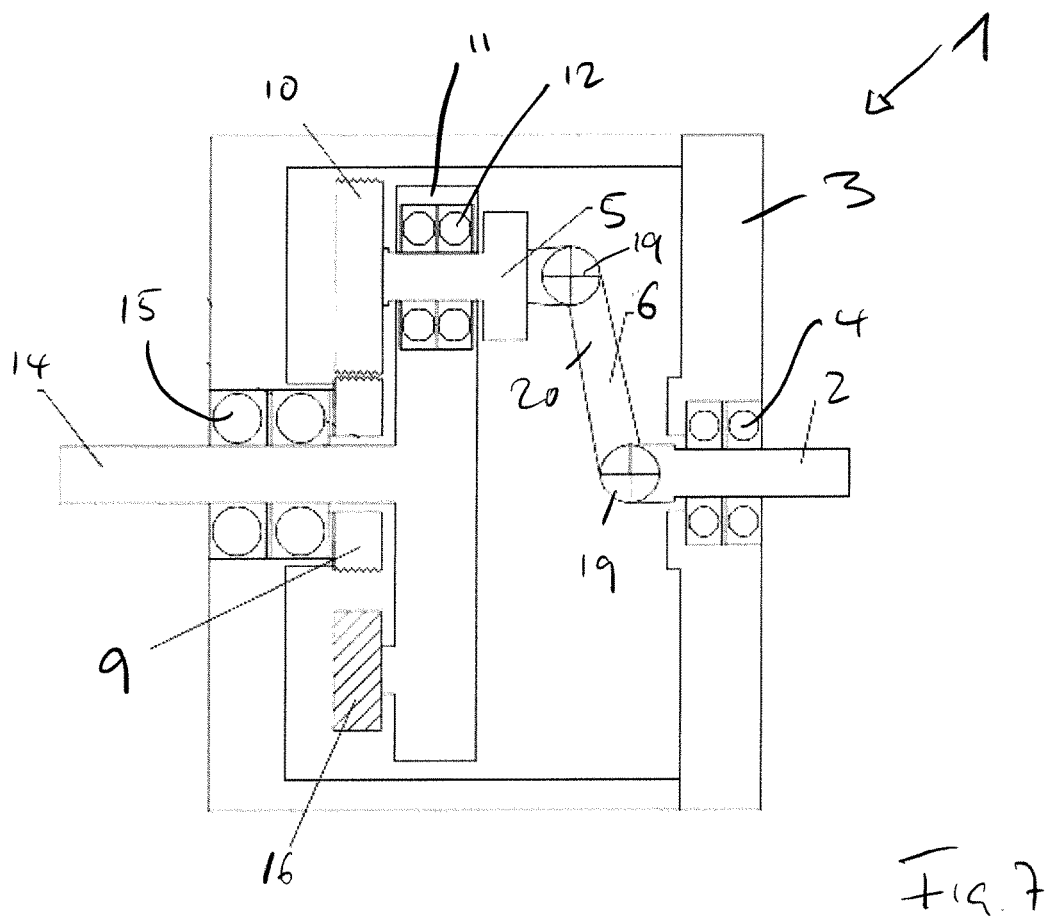
FIG. 7 shows a schematic sectional view of a second embodiment of the gear mechanism.
Figure 8:
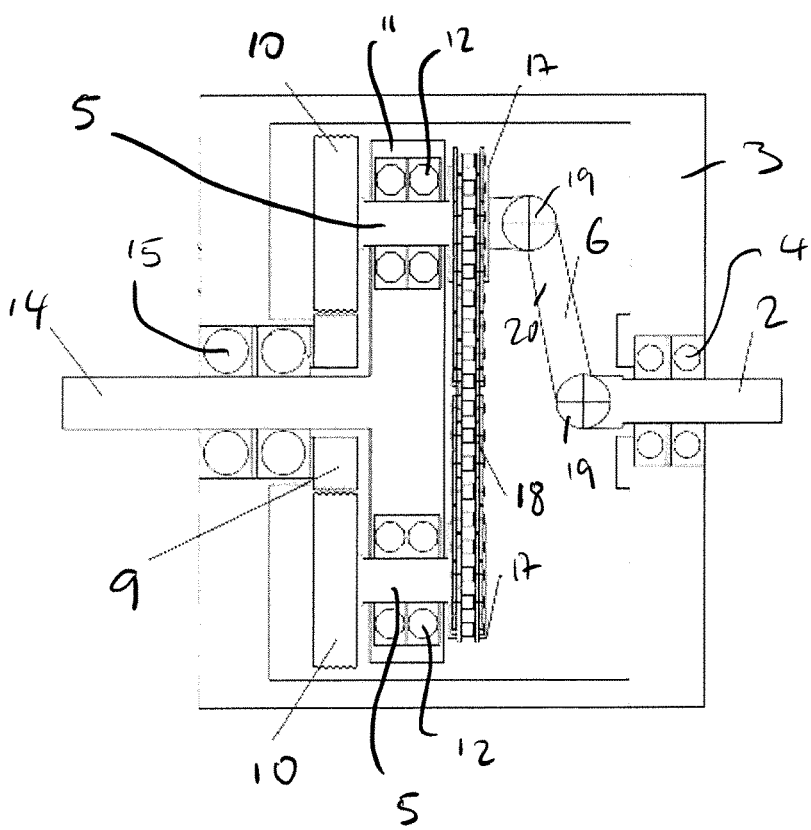
FIG. 8 shows a schematic sectional view of a second embodiment of the gear mechanism.
Figure 9:
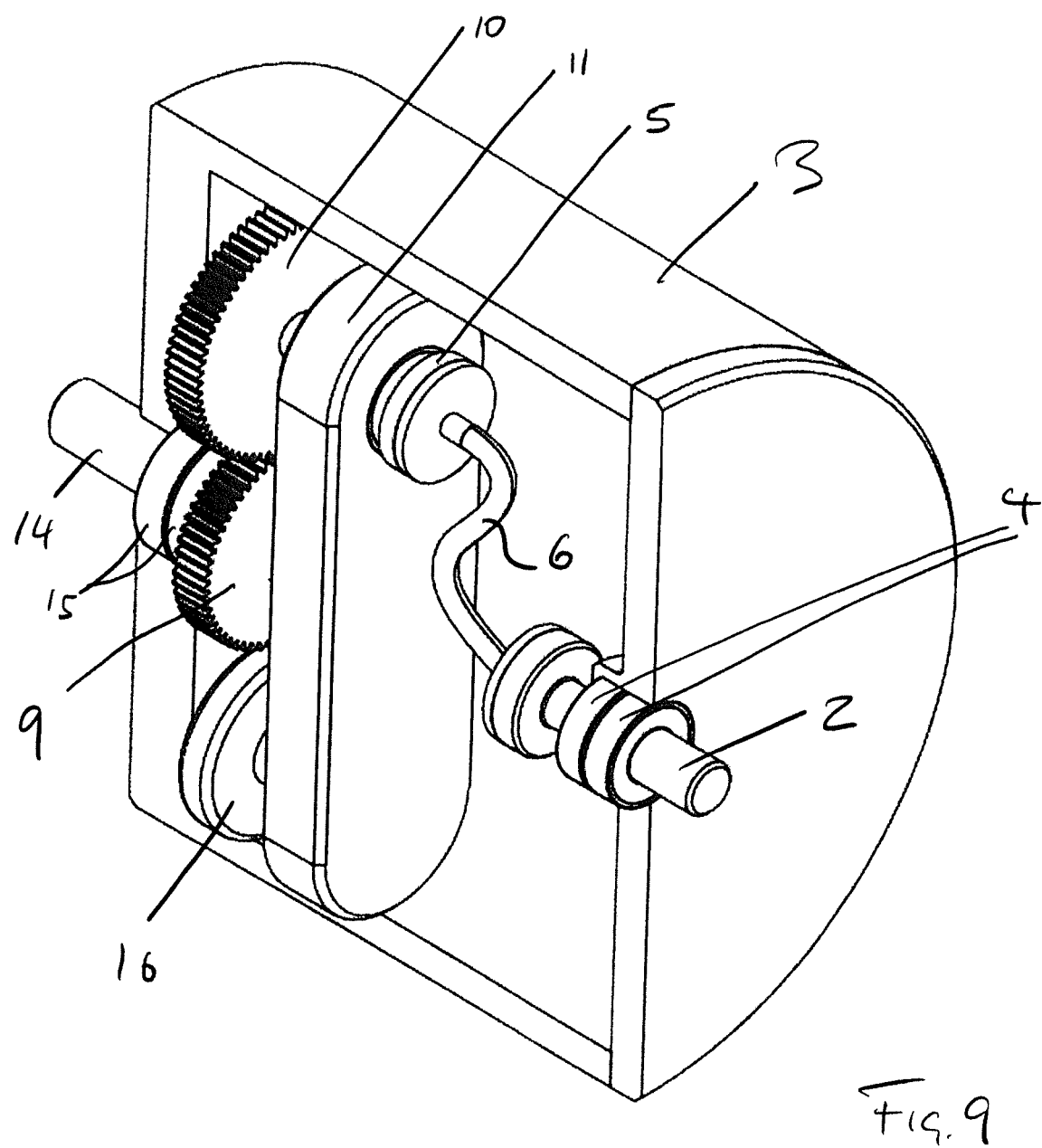
FIG. 9 shows a perspective, partially cut view of an embodiment similar to the embodiment shown in FIG. 5.
Figure 10:
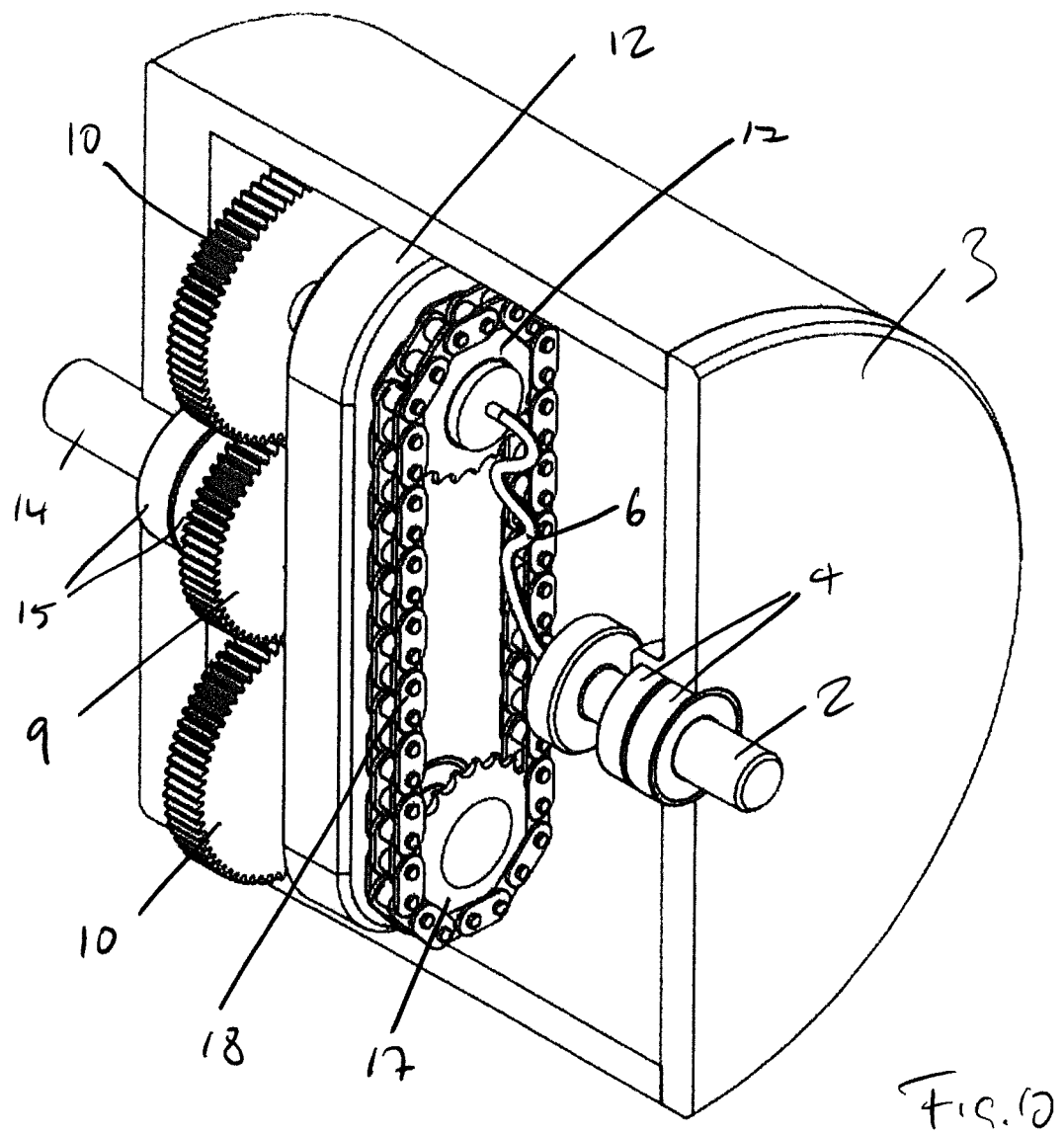
FIG. 10 shows a perspective, partially cut view of an embodiment similar to the embodiment shown in FIG. 6.
Figure 11:
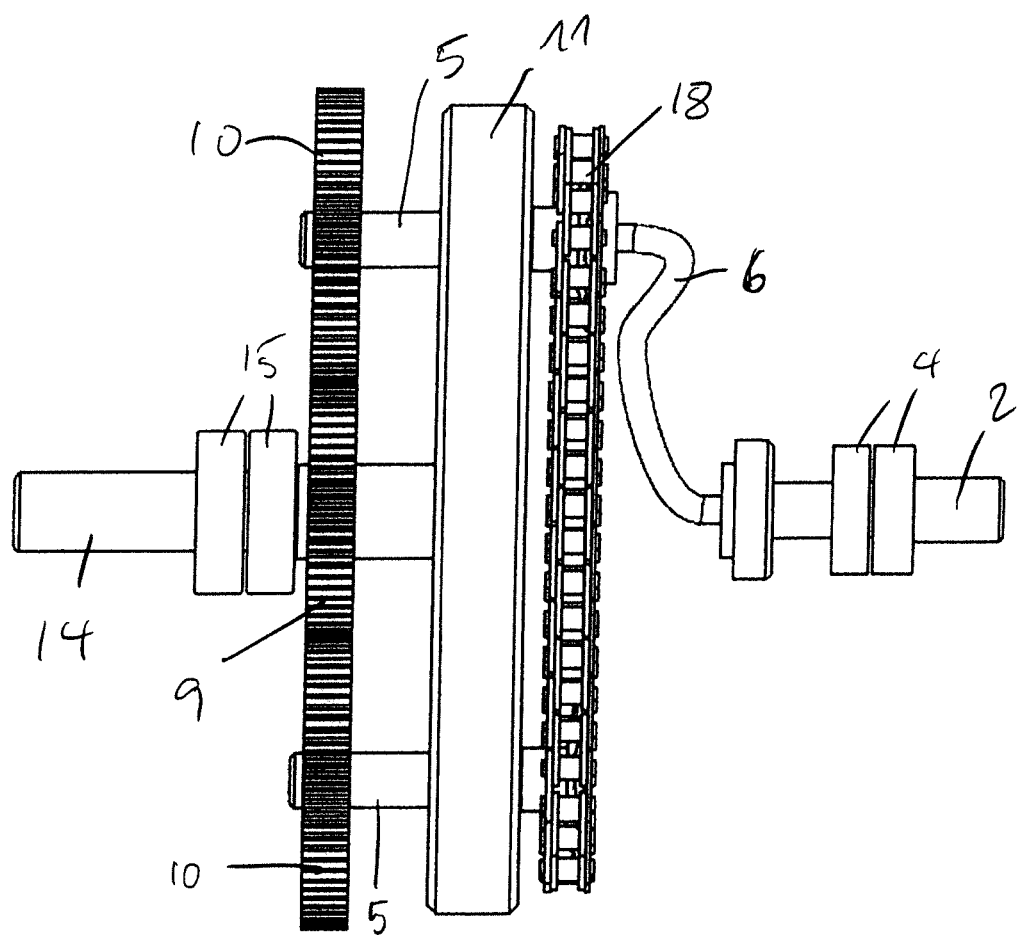
FIG. 11 shows a perspective view of the parts of an embodiment similar to the one shown in FIG. 6 without the housing.
Figure 12:
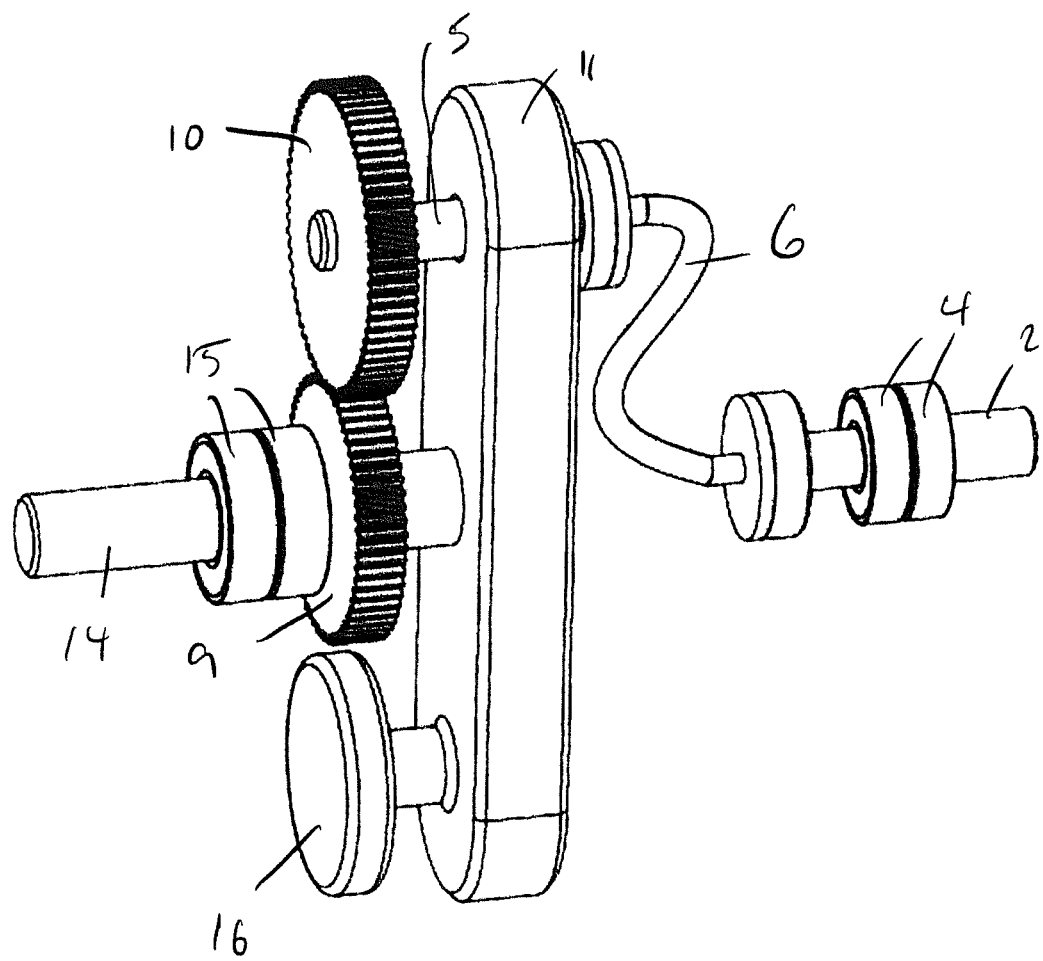
FIG. 12 shows a perspective view of the parts of an embodiment similar to the one shown in FIG. 5 without the housing.
Figure 13:
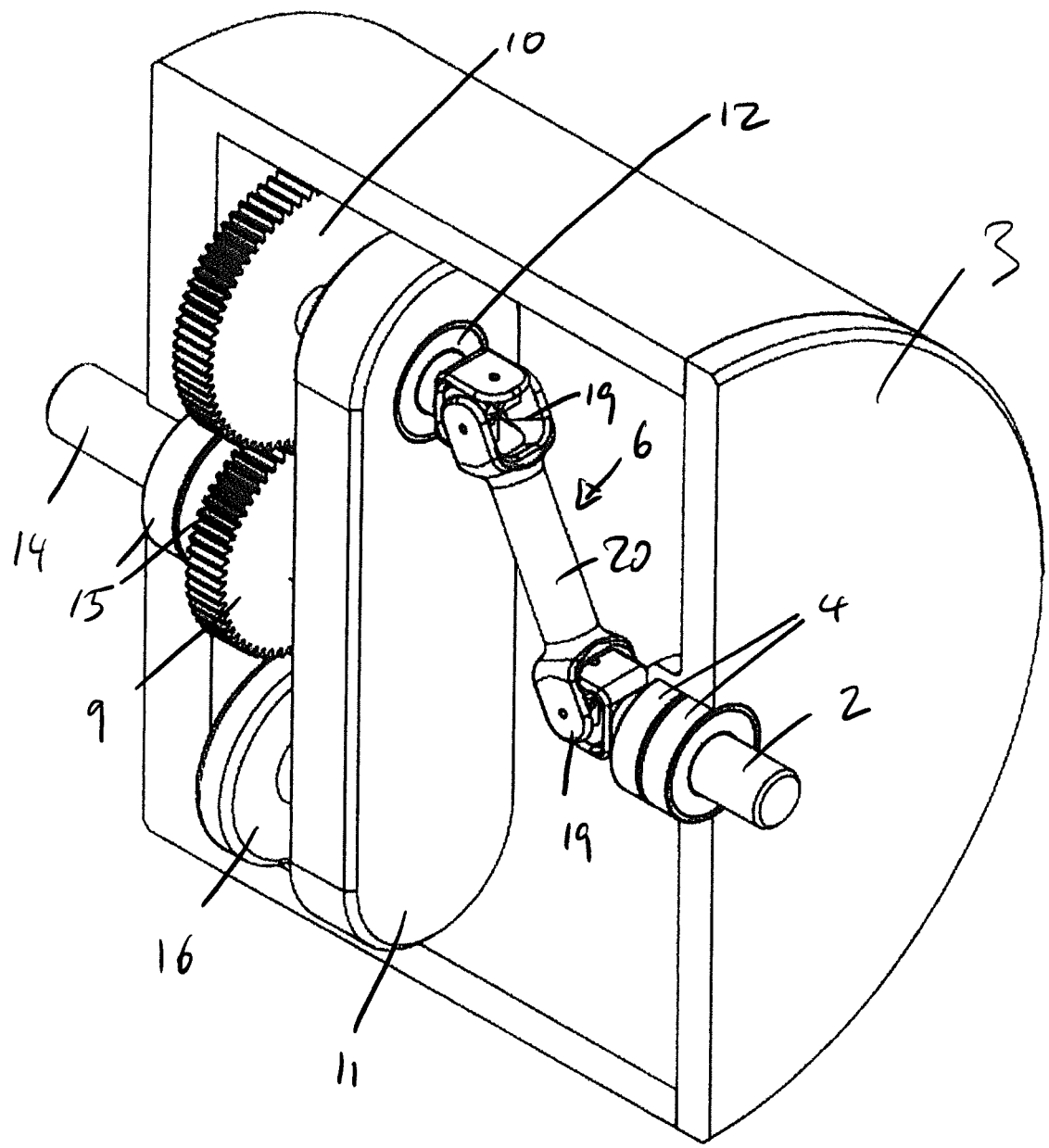
FIG. 13 shows a perspective, partially cut view of an embodiment similar to the embodiment shown in FIG. 7.
Figure 14:
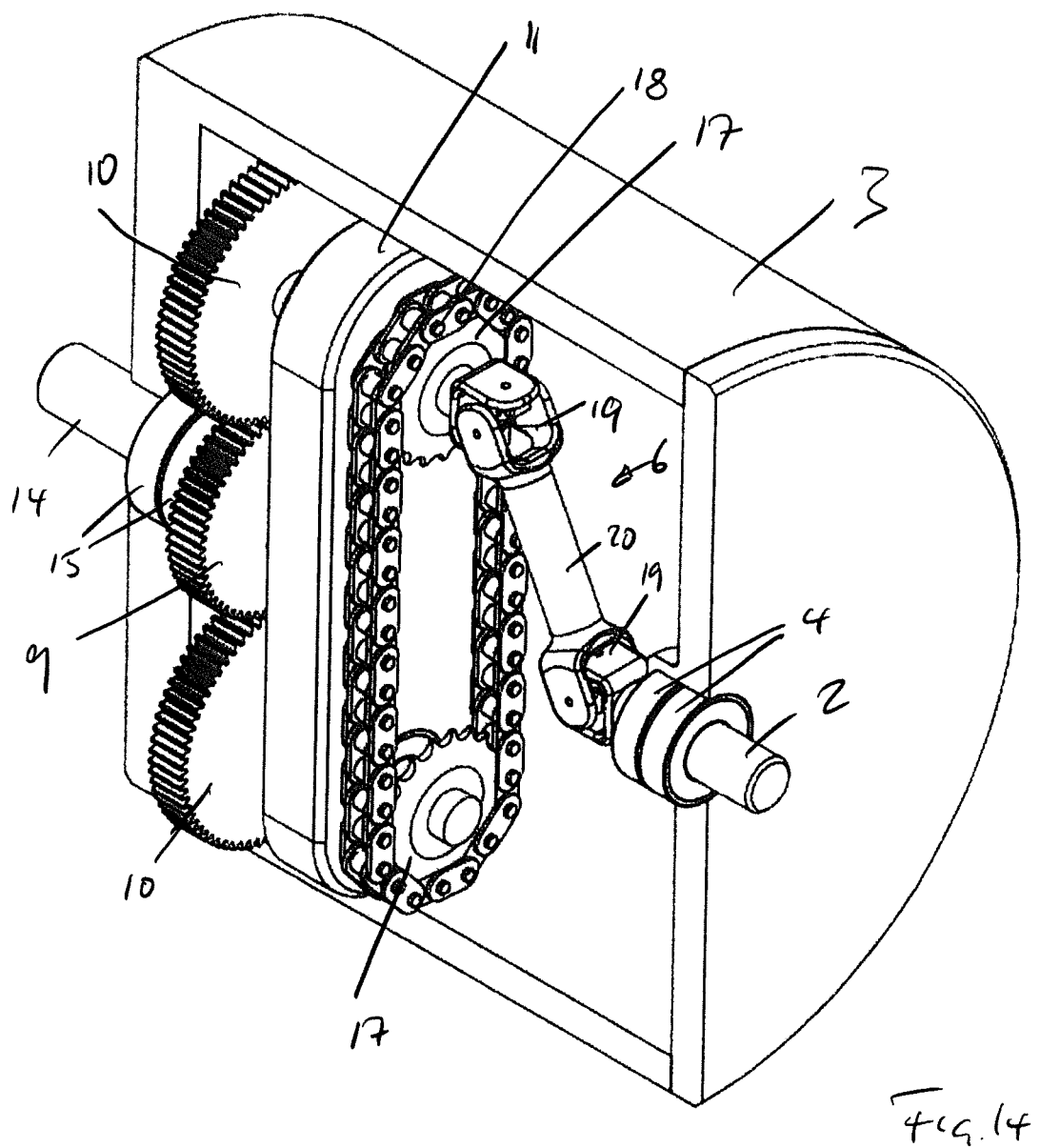
FIG. 14 shows a perspective, partially cut view of an embodiment similar to the embodiment shown in FIG. 8.
Figure 15:
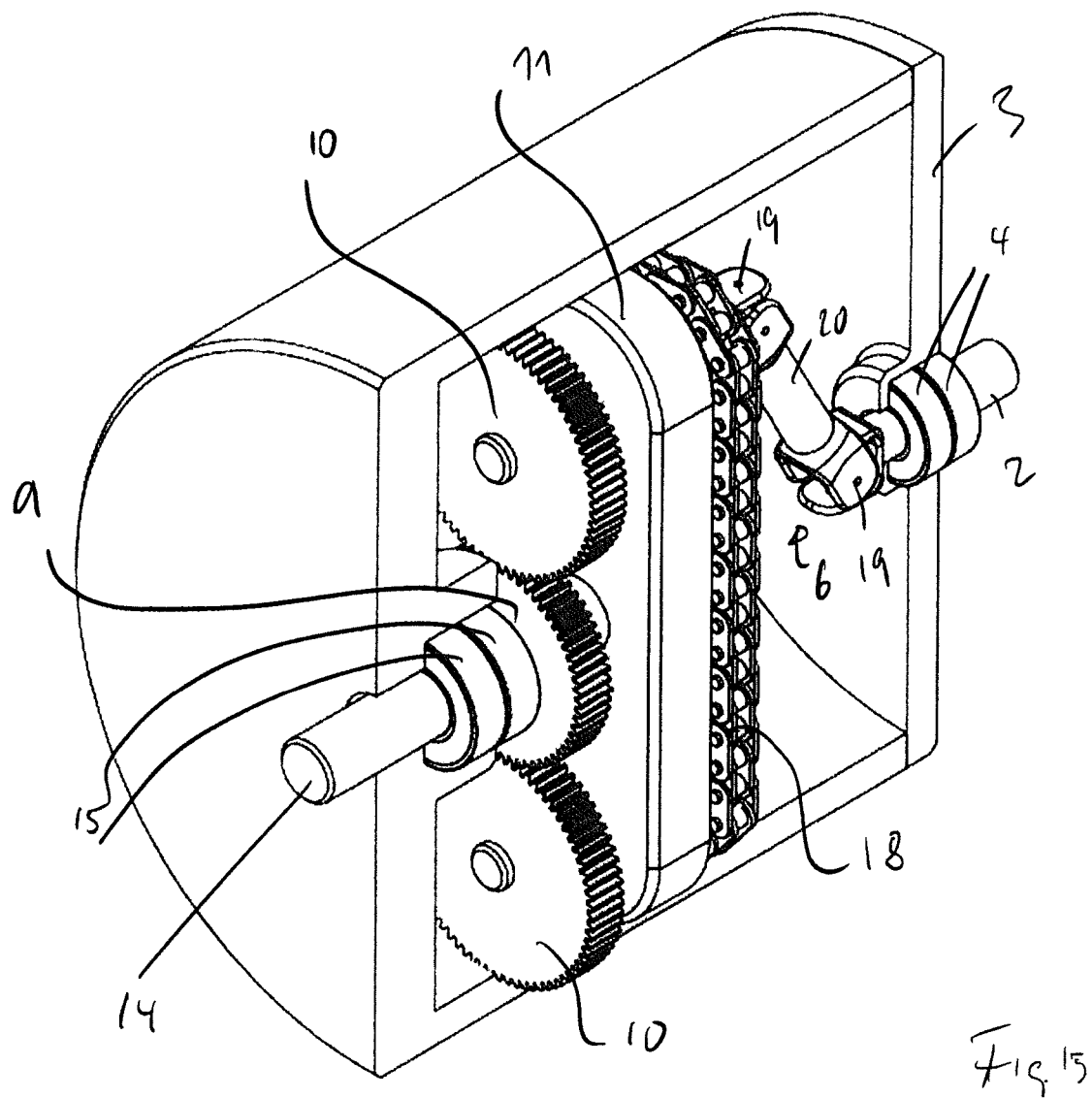
FIG. 15 shows a perspective, partially cut view of an embodiment similar to the embodiment shown in FIG. 8.
Figure 16:
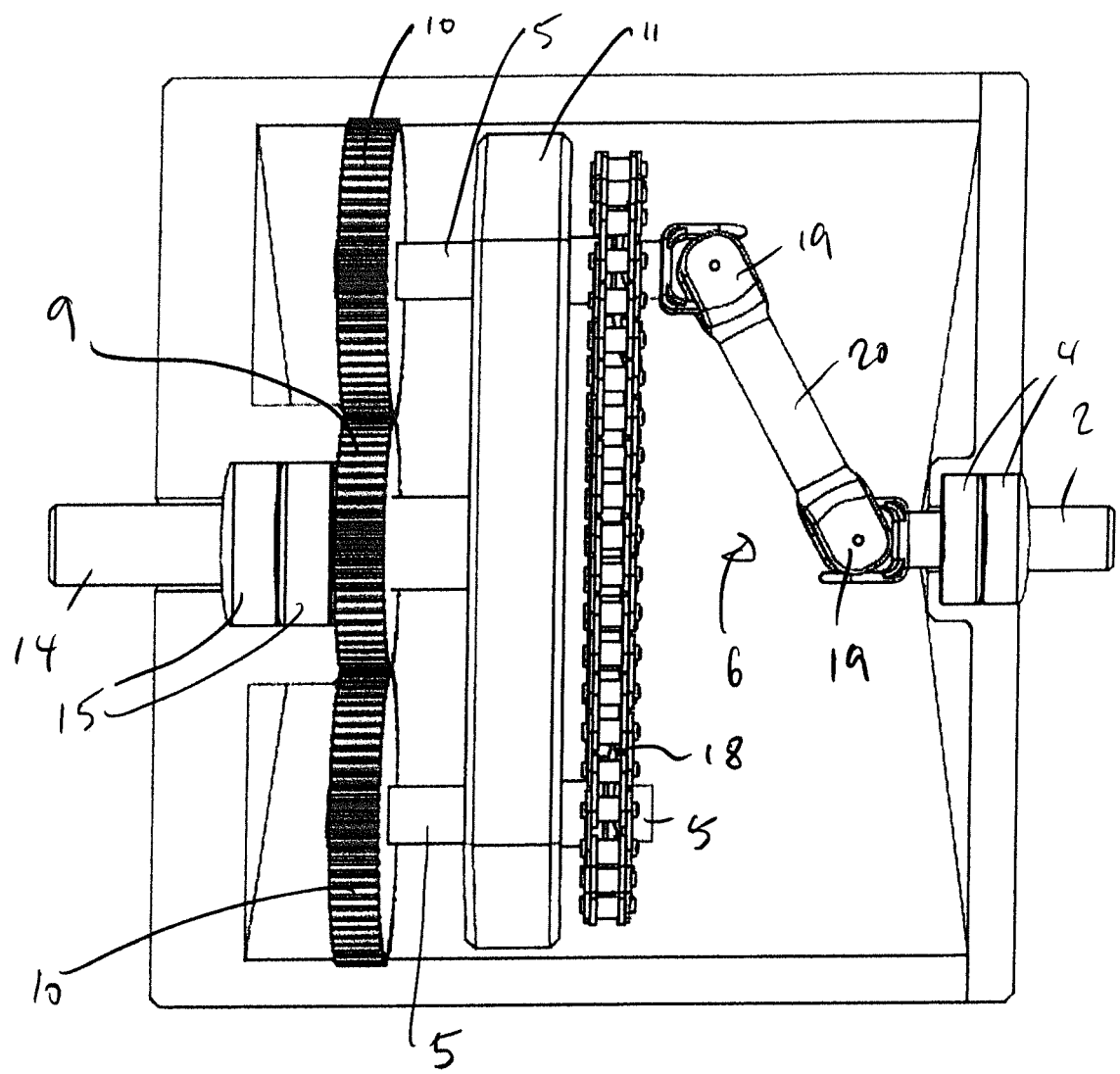
FIG. 16 shows a side view, partially cut of an embodiment similar to the embodiment shown in FIG. 8.
Figure 17:
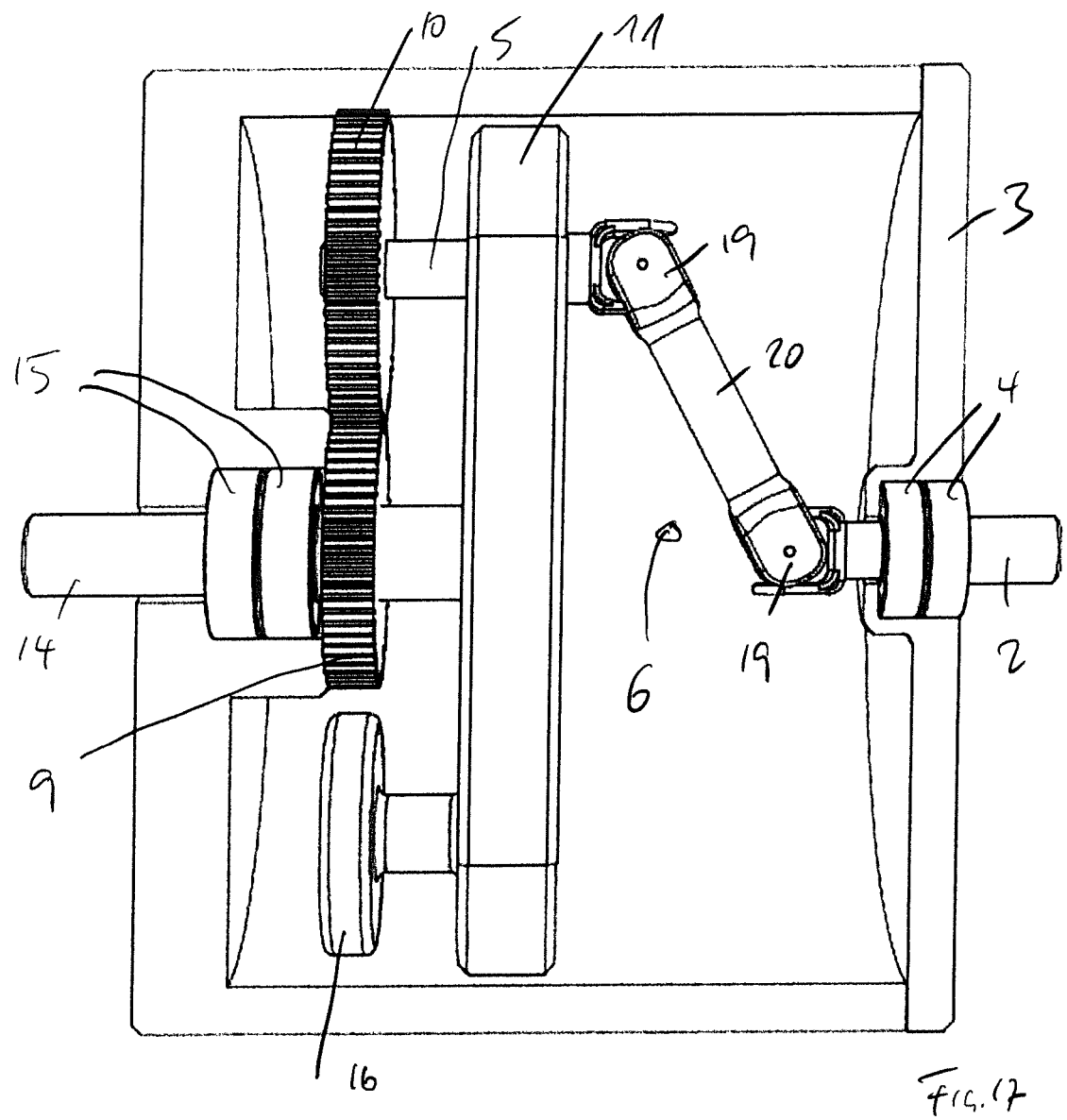
FIG. 17 shows a perspective, partially cut view of an embodiment similar to the embodiment shown in FIG. 7.

In the embodiments of FIGS. 7 and 8 and 13 to 17 the force transmitting member 6 comprises two universal joint 19 (often also referred to as universal coupling, U-joint, Cardan joint, Spicer or Hardy Spicer joint, or Hooke's joint), which in FIGS. 7 and 8 are symbolized by the circles with the cross in the middle. It consists of a pair of hinges located close together, oriented at 90° to each other, connected by a cross shaft. The first universal joint 19 is connected with the input shaft 2 on one side and a rod 20 on the other side. The rod 20 is connected to the second universal joint 19 on its other side, the second universal joint 19 being connected to the intermediate shaft 5 on its respective other side. Thereby the force transmitting member 6 can rotate the intermediate shaft 5 in the same direction as the input shaft 2.

FIGS. 18 and 19 show a gear wheel that could for example be used as an intermediate shaft output member 10 and that has radially moveable weights 21. The gear wheel is provided with a first weight 21 moveably arranged on a first guide 22, the first guide 22 being arranged to point in the radial direction, a tension means 23 being in contact with the first weight 21 such that the tension means 23 is tensioned as the first weight 21 moves radially outward along the first guide 22, and a second weight 21 moveably arranged on a second guide 22, the second guide 22 being arranged to point in the radial direction, a tension means 23 being in contact with the second weight 21 such that the tension means 23 is tensioned as the second weight 21 moves radially outward along the second guide 22.

The first guide 22 and the second guide 22 are a radially arranged bar that passes through the first weight 21 or the second weight 21 respectively. The tension means 23 are coil springs that are arranged radially outward of the weight 21 and are compressed as the weight 21 moves radially outward.

FIGS. 20 and 21 show a tensioning sprocket 24 that can be used in preferred embodiments where a roller chain is provided, for example as first force transmitting member 6 or second force transmitting member 6' or auxiliary force transmitting member 18. The tensioning sprocket 24 has a modified base between the teeth 25 of the sprocket 24. The modified base has an engaging member 26 for engagement with a bush 27 of the roller chain. The modified base furthermore has radial tensioning means 28 that apply a radially outward pointing force to the engaging member 26, when the engaging member 26 is displace radially inward. The radial tensioning means 28 is a coil spring that is arranged in radial bores of the sprocket 24.

The invention claimed is:

1. A gear mechanism for increasing torque, comprising:
   an input shaft;
   at least one intermediate shaft;
   where the at least one intermediate shaft is parallel to and offset from the input shaft; and
   at least one force transmitting member connecting the input shaft and the at least one intermediate shaft;
   wherein the at least one force transmitting member is configured for rotating the at least one intermediate shaft in a same direction as the input shaft;

wherein the at least one intermediate shaft is mated with at least one fixed mating member and is rotatably connected to a rotatable support member;

wherein the support member is rotatable about the input shaft and connected to an output shaft; and wherein the force transmitting member is a flexible drive shaft or comprises a universal joint;

wherein the gear mechanism is housed in a housing and wherein the input shaft extends into the housing, and the output shaft extends out of the housing.

2. The gear mechanism of claim 1, wherein the gear mechanism comprises two intermediate shafts.

3. The gear mechanism of claim 2, wherein the two intermediate shafts are parallel to and offset from the input shaft, and are positioned on opposite sides of the input shaft.

4. The gear mechanism of claim 1, wherein the input shaft comprises at least one input shaft output member configured for rotating with the input shaft.

5. The gear mechanism of claim 1, wherein the at least one intermediate shaft comprises an intermediate shaft input member configured for rotating with the intermediate shaft.

6. The gear mechanism of claim 5, wherein the intermediate shaft input member is an external gear.

7. The gear mechanism of claim 1, wherein the at least one intermediate shaft comprises at least one intermediate shaft output member configured for rotating with the intermediate shaft and mating with the at least one fixed mating member.

8. The gear mechanism of claim 7, wherein the at least one intermediate shaft output member and the at least one fixed mating member are external gears.

9. The gear mechanism of claim 1, wherein the support member is fixed to the output shaft.

10. The gear mechanism of claim 1, wherein the intermediate shaft extends through the rotatable support member.

11. The gear mechanism of claim 1, wherein the output shaft extends through at least one of the at least one fixed mating member.

12. The gear mechanism of claim 1, where the at least one fixed mating member is fixed to the housing.

13. The gear mechanism of claim 1, wherein the force transmitting member is a flexible drive shaft; and wherein the flexible drive shaft is a device, having two ends, for transmitting rotary motion between two objects which are not fixed relative to one another, and is connected at one end of the two ends to an end of the input shaft and at another of the two ends to an end of the intermediate shaft.

14. The gear mechanism of claim 13, wherein the flexible drive shaft comprises a rotating wire rope or wire coil which is flexible and has torsional stiffness.

15. The gear mechanism of claim 1, wherein each of the intermediate shaft, the force transmitting member, the at least one fixed mating member, and the rotatable support member are within the housing.

* * * * *